(12) United States Patent
Donovan et al.

(10) Patent No.: US 11,697,502 B2
(45) Date of Patent: Jul. 11, 2023

(54) SYSTEMS AND METHODS FOR COOLING A HIGH VOLTAGE CABLE ON AN ELECTRIC AIRCRAFT

(71) Applicant: BETA AIR, LLC, South Burlington, VT (US)

(72) Inventors: Sean Donovan, Richmond, VT (US); Sam Wagner, South Burlington, VT (US); Quinn Perini, South Burlington, VT (US)

(73) Assignee: BETA AIR, LLC, South Burlington, VT (US)

(*) Notice: Subject to any disclaimer, the term of this patent is extended or adjusted under 35 U.S.C. 154(b) by 0 days.

(21) Appl. No.: 17/528,466

(22) Filed: Nov. 17, 2021

(65) Prior Publication Data
US 2023/0150674 A1 May 18, 2023

(51) Int. Cl.
*B64D 13/00* (2006.01)
*B64C 29/00* (2006.01)
*B64D 27/24* (2006.01)

(52) U.S. Cl.
CPC ............ *B64D 13/006* (2013.01); *B64C 29/00* (2013.01); *B64D 27/24* (2013.01)

(58) Field of Classification Search
CPC .............................. B64D 13/006; B64D 27/24
See application file for complete search history.

(56) References Cited

U.S. PATENT DOCUMENTS

| | | | |
|---|---|---|---|
| 7,305,842 B1 | 12/2007 | Schiff | |
| 8,608,106 B2* | 12/2013 | Baumgardt | B64C 21/06 |
| | | | 244/53 B |
| 8,794,571 B2* | 8/2014 | Baumgardt | B64C 1/26 |
| | | | 244/57 |
| 9,415,878 B2* | 8/2016 | Wetzel | B64D 33/08 |
| 9,614,209 B2 | 4/2017 | Jones et al. | |
| 9,932,123 B2 | 4/2018 | Maloney et al. | |
| 9,999,164 B2* | 6/2018 | Kimura | H05K 7/20881 |
| 10,150,570 B2* | 12/2018 | Joubert | B64D 27/24 |
| 10,177,424 B1* | 1/2019 | Melack | H01M 10/6567 |
| 10,301,032 B2 | 5/2019 | Carr et al. | |
| 10,316,693 B2* | 6/2019 | Stolte | B64D 33/10 |
| 10,669,037 B1* | 6/2020 | Kwon | B64D 33/08 |
| 10,903,535 B2* | 1/2021 | Melack | H01M 10/6563 |
| 2011/0017426 A1* | 1/2011 | Baumgardt | B64D 33/08 |
| | | | 165/59 |
| 2012/0160445 A1* | 6/2012 | Baumgardt | B64D 13/006 |
| | | | 165/41 |

(Continued)

*Primary Examiner* — Philip J Bonzell
(74) *Attorney, Agent, or Firm* — Caldwell Intellectual Property Law

(57) ABSTRACT

In an aspect of the present disclosure is a system for cooling a high voltage (HV) cable on an electric aircraft, including a fuselage configured to receive the HV cable, including a first side comprising a first venting closure movable between an open position and a closed position. The fuselage may further comprise a second side opposite the first side, the second side comprising a second venting closure movable between an open position and a closed position; wherein the first and second venting closures are configured to create a cooling channel between the first and second venting closures when the first and second venting closures are in the open position, wherein the cooling channel contacts the HV cable.

18 Claims, 13 Drawing Sheets

(56) References Cited

U.S. PATENT DOCUMENTS

| | | | |
|---|---|---|---|
| 2014/0345305 A1* | 11/2014 | Sieme | B64D 13/08 |
| | | | 165/96 |
| 2015/0232191 A1* | 8/2015 | Wetzel | B64D 13/006 |
| | | | 62/61 |
| 2017/0162921 A1* | 6/2017 | Schuhmann | H01M 10/02 |
| 2021/0066680 A1 | 3/2021 | Amante | |
| 2021/0155350 A1* | 5/2021 | Kwon | B64C 27/08 |

* cited by examiner

SYSTEMS AND METHODS FOR COOLING A HIGH VOLTAGE CABLE ON AN ELECTRIC AIRCRAFT

FIELD OF THE INVENTION

The present invention generally relates to the field of electric aircraft. In particular, the present invention is directed to systems and methods for cooling a high voltage cable on an electric aircraft.

BACKGROUND

Cooling vents for aircraft may aid in reducing the heat of areas or devices within the aircraft. The functionality of cooling vents may be limited by their design and placement.

SUMMARY OF THE DISCLOSURE

In an aspect of the present disclosure is a system for cooling a high voltage cable on an electric aircraft, including a fuselage configured to receive the HV cable, including a first side comprising a first venting closure movable between an open position and a closed position. The fuselage may further comprise a second side opposite the first side, the second side comprising a second venting closure movable between an open position and a closed position; wherein the first and second venting closures are configured to create a cooling channel between the first and second venting closures when the first and second venting closures are in the open position, wherein the cooling channel contacts the HV cable.

In another aspect of the present disclosure, a method for implementing a system for cooling a HV cable on an electric aircraft includes opening, at a first side of a fuselage of the electric aircraft that is configured to receive the HV cable, a first venting closure movable between an open position and a closed position; opening, at a second side of the fuselage opposite the first side, a second venting closure movable between an open position and a closed position; wherein the first and second venting closures are configured to create a cooling channel between the first and second venting closures when the first and second venting closures are in the open position, wherein the cooling channel contacts the a HV cable.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1A:
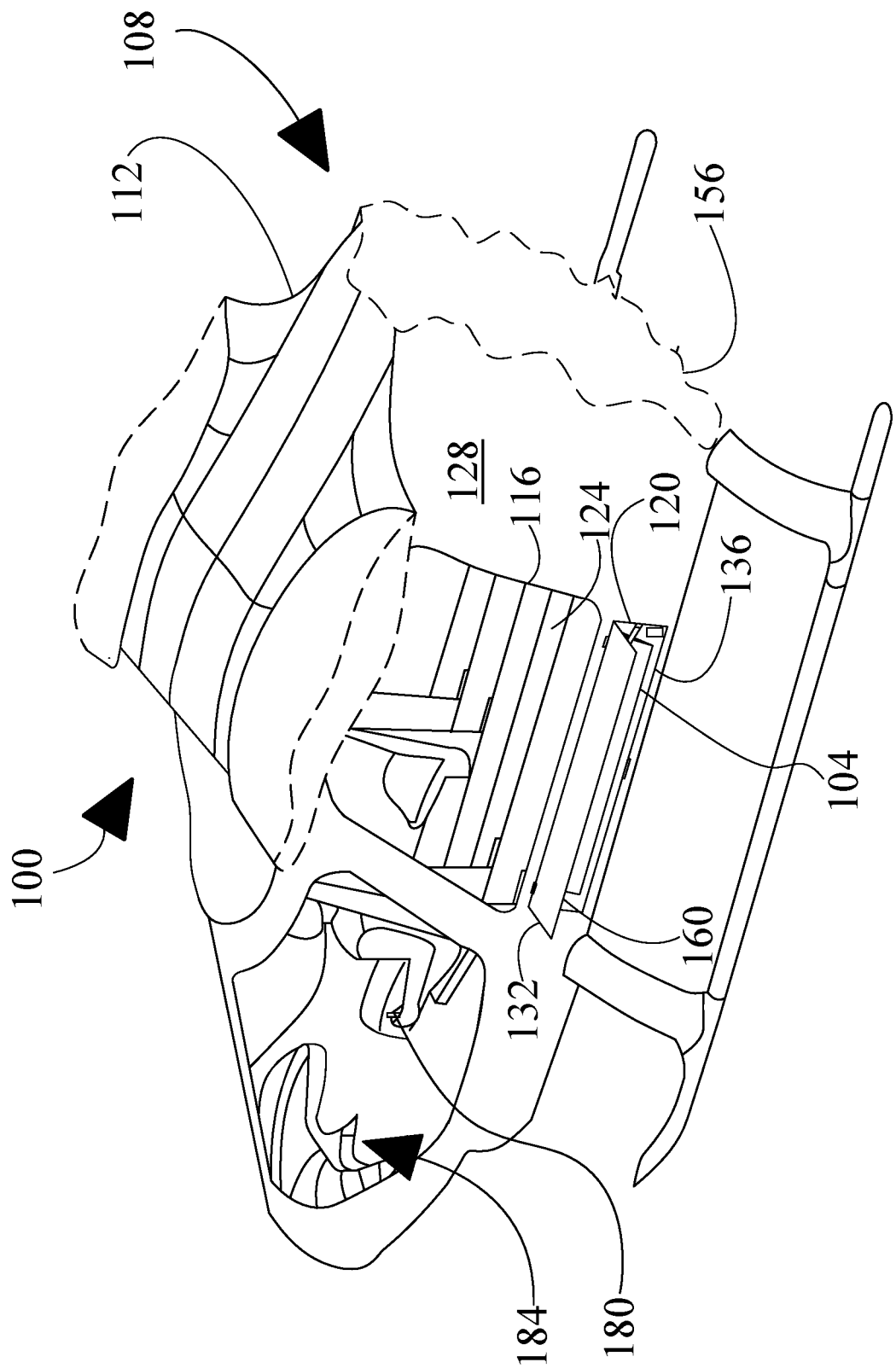
FIG. 1A is a left perspective view of an embodiment of a system for cooling a HV cable on an electric aircraft.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for cooling a HV cable on an electric aircraft. In an embodiment, aspects of the present disclosure are systems and methods to cool a HV cable in a fuselage of an electric aircraft by manipulating venting closures.

Aspects of the present disclosure can be used to safely and effectively cool a HV cable in the fuselage. Aspects of the present disclosure can also be used to provide easy access to the battery pack's high voltage connection. This is so, at least in part, because the venting closures are positioned to provide access to the high voltage connection from outside the fuselage. Exemplary embodiments illustrating aspects of the present disclosure are described below in the context of several specific examples.

For purposes of description in this disclosure, the terms "up", "down", "left", "right", "above", "below", "beneath", and derivatives thereof shall relate to the invention as oriented in FIGS. 1A-1C. Furthermore, there is no intention to be bound by any expressed or implied theory presented in the preceding technical field, background, brief summary, or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed in this disclosure are not to be considered as limiting, unless the claims expressly state otherwise.

"Communicatively connected," for the purposes of this disclosure, is a process whereby one device, component, or circuit is able to receive data from and/or transmit data to another device, component, or circuit. Communicative connection may be performed by wired or wireless electronic communication, either directly or by way of one or more intervening devices or components. In an embodiment, communicative connection includes electrically connection an output of one device, component, or circuit to an input of another device, component, or circuit. Communicative connection may be performed via a bus or other facility for intercommunication between elements of a computing device. Communicative connection may include indirect connections via "wireless" connection, low power wide area network, radio communication, optical communication, magnetic, capacitive, or optical connection, or the like. In an embodiment, communicative connecting may include electrically connecting an output of one device, component, or circuit to an input of another device, component, or circuit. Communicative connecting may be performed via a bus or other facility for intercommunication between elements of a computing device. Communicative connecting may include indirect connections via "wireless" connection, low power wide area network, radio communication, optical communication, magnetic, capacitive, or optical connection, or the like.

Figure 1B:
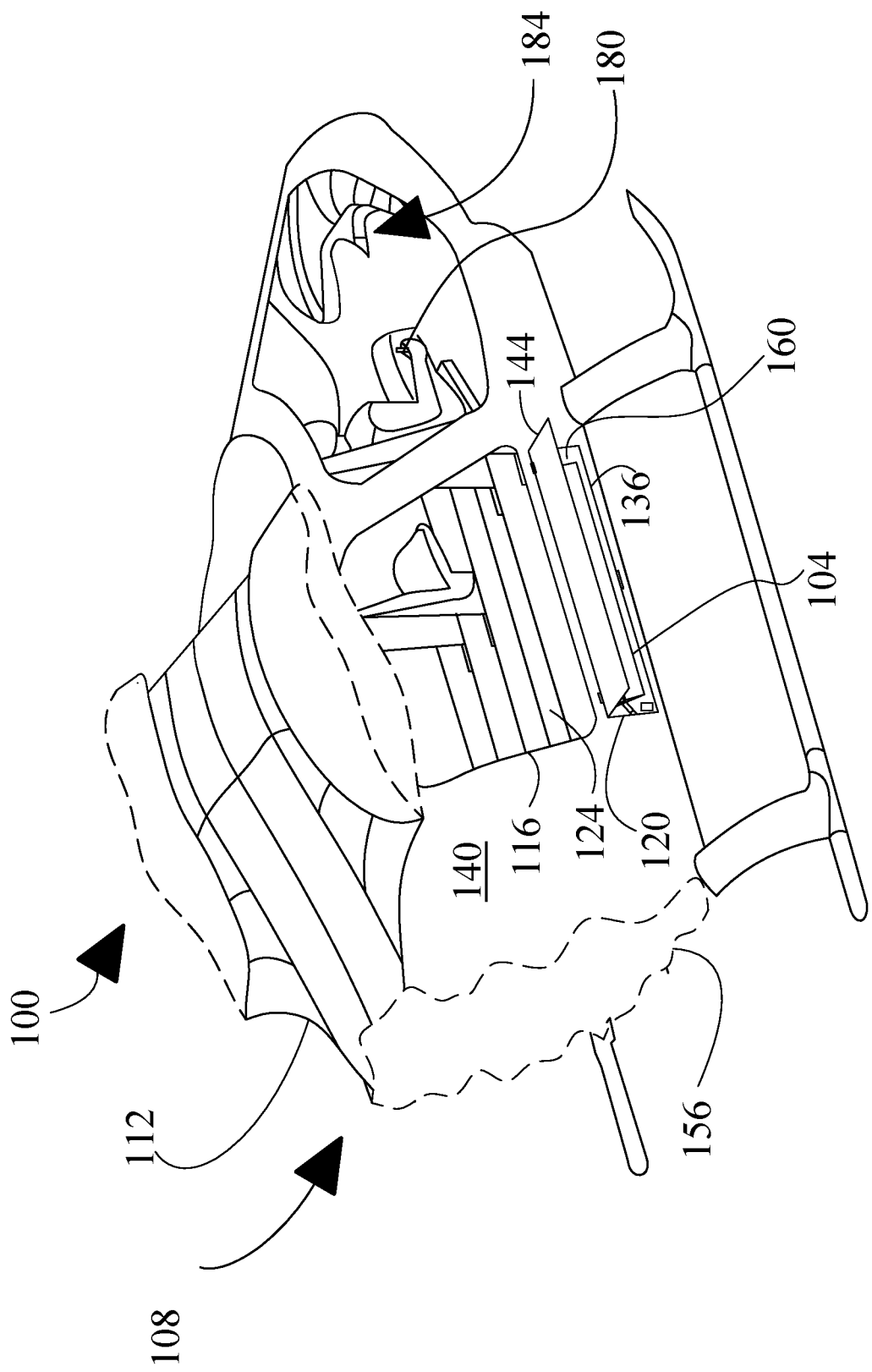
FIG. 1B is a right perspective view of an embodiment of the system for cooling a HV cable on an electric aircraft illustrated in FIG. 1A.
Figure 1C:
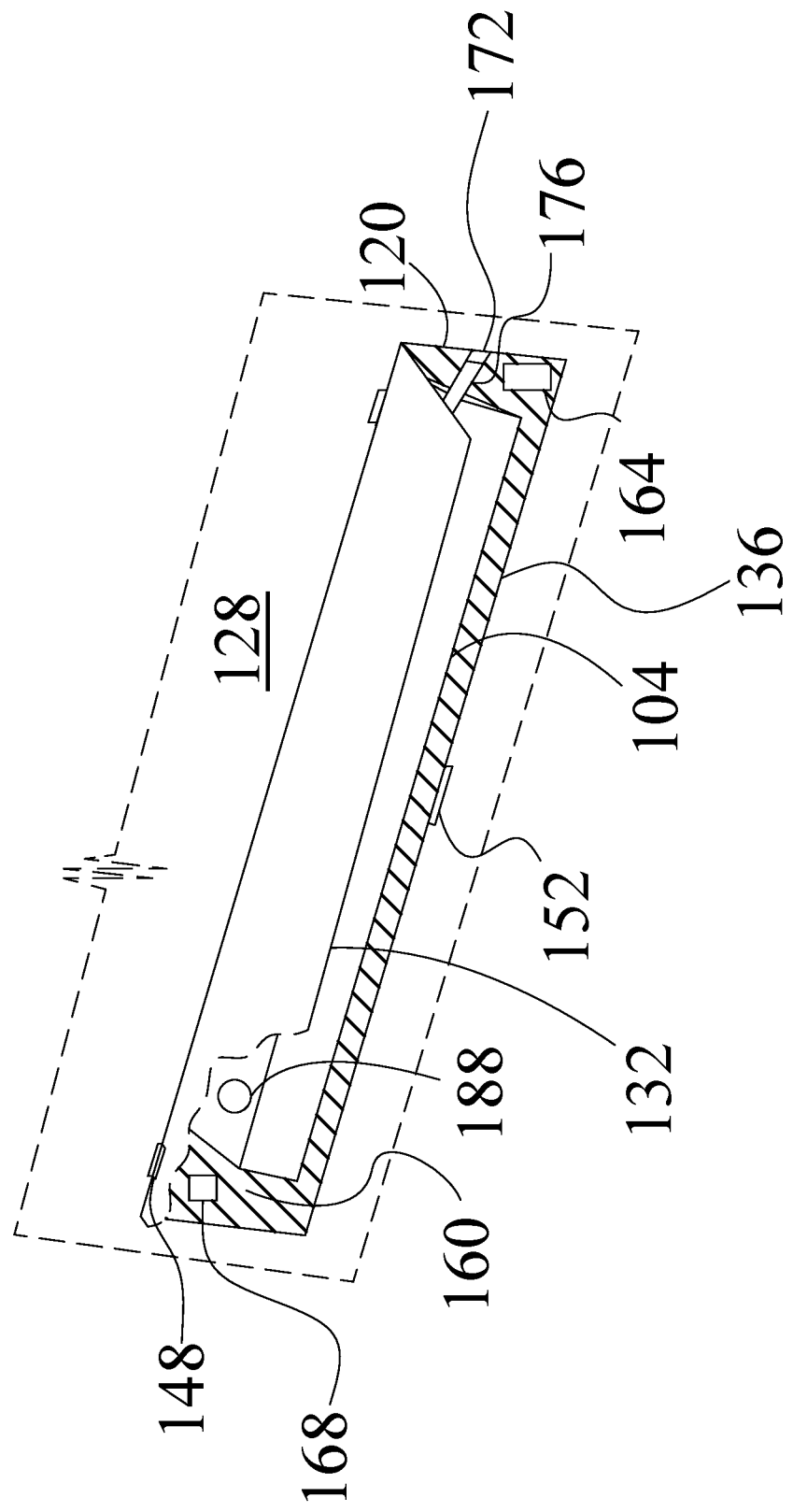
FIG. 1C is a magnified left perspective view of components of the system for cooling a HV cable on an electric aircraft.

Referring now to FIGS. 1A-1C, a left perspective view, a right perspective view, and a magnified left perspective view, respectively, of an exemplary embodiment of a system 100 for cooling a high voltage (HV) cable 104 on an electric aircraft 108 are illustrated. Electric aircraft 108 may comprise an electric vertical takeoff and landing (eVTOL) aircraft. Electric aircraft 108 may be capable of rotor-based cruising flight, rotor-based takeoff, rotor-based landing, fixed-wing cruising flight, airplane-style takeoff, airplane-style landing, and/or any combination thereof "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight.

With continued reference to FIGS. 1A-1C, electric aircraft 108 includes a fuselage 112. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 112 may comprise structural elements that physically support the shape and structure of an aircraft. Structural elements may take a plurality of forms, alone or in combination with other types. Structural elements may vary depending on the construction type of aircraft and specifically, fuselage 112. Fuselage 112 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber. An energy source may be used to provide a steady supply of electrical power to a load over a flight by electric aircraft 108. Electric aircraft 108 may include a flight controller consistent with disclosure of flight controller in U.S. patent application Ser. No. 17/404,614 filed on Aug. 17, 2021 and titled "SYSTEMS AND METHODS FOR REDUNDANT FLIGHT CONTROL IN AN AIRCRAFT", which is incorporated in its entirety herein by reference.

Still referring to FIGS. 1A-1C, fuselage 112 is configured to receive HV cable 104, which is described in detail below. As used in this disclosure, "HV cable" is cable configured to mechanically connect to and provide an electrical connection between a battery pack and an electric aircraft and/or components of an electric aircraft. HV cable may include multiple HV cables. As used in this disclosure, "battery pack" means one or more battery packs. Battery pack may include one or more thermal diffusers such as heat sinks, heat pumps, heat pipes, conducting plates, and conducting fins. The thermal diffusers may extend from Battery pack to dissipate heat away from the Battery pack. Fuselage 112 may be configured to carry passengers and/or cargo in an area accessible via a passenger entrance 116. In some embodiments, fuselage 112 may be configured to receive HV cable 104 in a cable compartment 120. Cable compartment 120 may be located beneath a floor 124 of fuselage 112 such that, when electric aircraft 108 is grounded, the cable compartment 120 is between the ground and floor 124. Cable compartment 120 may have an internal cavity in which HV cable 104 is housed or contained. HV cable 104 may be consistent with disclosure of battery pack in U.S. patent application Ser. No. 17/348,960 filed on Jun. 16, 2021 and titled "BATTERY PACK FOR ELECTRIC VERTICAL TAKE-OFF AND LANDING AIRCRAFT", which is incorporated in its entirety herein by reference. HV cable 104 may connect to electric aircraft 108 and/or one or more components of the electric aircraft 108 via high voltage connections. Fuselage 112 may include a battery bay configured to house battery pack. In some embodiments, cable compartment 120 may be separated from battery bay. In other embodiments, cable compartment 120 may be join to and/or include a pathway to battery bay.

With continued reference to FIGS. 1A-1C, fuselage 112 includes a first side 128 that comprises a first venting closure 132 movable between an open position and a closed position over a vent 136. As used in this disclosure a "venting closure" is a covering for a vent that substantially seals the vent and separates an internal cavity of a battery bay from the outside environment; a venting closure may include one or more venting closures. As used in this disclosure, an "open position" is a position of a venting closure relative to a fuselage that leaves vent opening that the venting closure is configured to cover at least partially uncovered. As used in this disclosure, a "closed position" is a position of a venting closure relative to a fuselage that completely covers a vent opening the venting closure is configured to cover. Fuselage 112 may include a second side 140 opposite first side 128. Second side 140 may include a second venting closure 144 movable between an open position and a closed position over a vent 136; second venting closure 144 may be implemented in any manner suitable for implementation of first venting closure 132. First venting closure 132 and second venting closure 144 may be composed wholly or in part of any suitable material such as aluminum, fiberglass, and/or carbon fiber. First venting closure 132 and second venting closure 144 may include a sealing material such as an elastomer, rubber, plastic, or a combination thereof to provide a seal against first side 128 and second side 140, respectively, when the first venting closure 132 and the second venting closure are in closed position. When in closed position, first venting closure 132 and second venting closure may create an airtight seal against first side 128 and second side 140, respectively. First venting closure 132 and second venting closure 144 may, in a non-limiting example, include hinged flaps with hinges 148 attached to the corresponding side of fuselage 112 allowing the venting closures to pivot away from fuselage 112. In some embodiments, as a further non-limiting example, first venting closure 132 and second venting closure 144 may be sliding panels that may be configured to move along first side 128 and second side 140 of fuselage 112, and/or into recesses within first side 128 and second side 140, respectively. First venting closure 132 and second venting closure 144 may each comprise a securing mechanism 152 to maintain first venting closure 132 and second venting closure 144 in the closed position. Securing mechanism 152 may comprise a latch or any other securing mechanism commonly known by one skilled in the art. In some embodiments, first venting closure 132 and second venting closure 144 may face each other. First venting closure 132 may be directly across fuselage 112 from second venting closure 144. Fuselage 112 may include a bottom side 156 facing the ground; first venting closure 132 may be between passenger entrance 116 and the bottom side 156.

Still referring to FIGS. 1A-1C, first venting closure 132 and second venting closure 144 may be configured to create a cooling channel 160 between first venting closure 132 and second venting closure 144 when first venting closure 132 and second venting closure 144 are in open position by exposing cooling channel 160 to outside air via the respective vent 136, such that the cooling channel 160 contacts HV cable 104. Cooling channel 160 may extend from first venting closure 132 to second venting closure 144. Cooling channel 160 may be substantially orthogonal to first side 128 and second side 140. Cooling channel 160 may cause air from outside fuselage 112 to pass through cable compartment 120 from vent 136 on first side 128 to vent 136 on second side 140 and/or from the vent 136 on the first side 128 to the vent 136 on the second side 140. In some embodiments, cooling channel 160 may contact battery pack. Cooling channel 160 may contact one or more thermal diffusers on battery pack to cool the thermal diffusers and increase heat dissipation from the HV cable 104. In some embodiments, distal ends of thermal diffusers may extend into cooling channel 160. As discussed below, HV cable 104 may include a pouch providing one or more vents to release ejecta including hot gas; HV cable 104 may be positioned in cable compartment 120 such that the vents are in or directed toward cooling channel 160. Also discussed below is an exemplary cooling circuit that may be connected to HV cable 104; the cooling circuit may be positioned between first venting closure 132 and second venting closure 144 such that cooling channel 160 contacts the cooling circuit. Cooling channel 160 may include entire cable compartment 120. In some embodiments, cooling channel 160 may include a direct path from vent 136 to vent 136. Cooling channel 160 may be configured to only pass through a portion of cable compartment 120. Cooling channel 160 may narrow to focus air over specific areas of cable compartment 120 such as part or all of HV cable 104 or one or more thermal diffusers. Cooling channel 160 may include diversions to direct air along a meandering pathway through cable compartment 120. In some embodiments, cooling channel 160 may include multiple pathways for air to travel.

In some embodiments, first venting closure 132 may be configured to create a first cooling channel, and second venting closure 144 may be configured to create a second cooling channel. First cooling channel and second cooling channel may each contact at least a portion of HV cable 104. In some embodiments, first cooling channel may be separate and distinct from second cooling channel, wherein the first cooling channel and the second cooling channel may cool distinct portions of HV cable 104. In some embodiments, a physical barrier, such as a wall, may be positioned between first venting closure 132 and second venting closure 144, thus separating first cooling channel from second cooling channel.

Still referring to FIGS. 1A-1C, at least one of first venting closure 132 and second venting closure 144 may provide access to a high voltage connection 164 configured to electrically connect to HV cable 104 when in the open position. As used in this disclosure, "access" and "access to" is defined as accessible for a user to manipulate with their person or a tool while outside of fuselage 112. "Electrical isolation", for the purposes of this disclosure, refer to a first system's separation of components carrying electrical signals or electrical energy from a second system's components. This allows a user to quickly access high voltage connection 164 to disconnect and, thus, electrically isolate HV cable 104 from all or part of the electrical system in electric aircraft 108. High voltage connection 164 may be located in cable compartment 120. In an embodiment, high voltage connection 164 may be near cable compartment 120 but still covered by first venting closure 132 and/or second venting closure 144 when in the closed position.

With continued reference to FIGS. 1A-1C, fuselage 112 may include an electrical vehicle port 168, wherein at least one of first venting closure 132 and second venting closure 144 may be configured to provide access to the electrical vehicle port 168. As used in this disclosure, an "electrical vehicle port" is a port located on an electric vehicle such as electric aircraft 108. Mating may be performed using a mechanical or electromechanical means described in this disclosure. For example, without limitation mating may include an electromechanical device used to join electrical conductors and create an electrical circuit. In some cases, mating may be performed by way of gendered mating components. A gendered mate may include a male component or plug which is inserted within a female component or socket. In some cases, mating may be removable. In some cases, mating may be permanent. In some cases, mating may be removable, but require a specialized tool or key for removal. Mating may be achieved by way of one or more of plug and socket mates, pogo pin contact, crown spring mates, and the like. In some cases, mating may be keyed to ensure proper alignment of a connector. In some cases, mate may be lockable. Electrical vehicle port 168 may be consistent with disclosure of electrical vehicle port in U.S. patent application Ser. No. 17/405,840 filed on Aug. 18, 2021 and titled "CONNECTOR AND METHODS OF USE FOR CHARGING AN ELECTRIC VEHICLE FIELD OF THE INVENTION" and disclosure of electric vehicle port in U.S. patent application Ser. No. 17/515,519 filed on Oct. 31, 2021 and titled "CONNECTOR FOR CHARGING AN ELECTRIC VEHICLE AND A METHOD FOR ITS USE", where are both incorporated herein in their entirety by reference. Electrical vehicle port 168 may be located in cable compartment 120. In an embodiment, electrical vehicle port 168 may be near cable compartment 120 but still covered by first venting closure 132 and/or second venting closure 144 when in closed position. First venting closure 132 and second venting closure 144 may provide access to a user outside of fuselage to perform maintenance on and/or replace HV cable 104. In some embodiments, first venting closure 132 may provide access to a first of HV cable 104 and second venting closure 144 may provide access to a second of HV cable 104.

With continued reference to FIGS. 1A-1C, first venting closure 132 and second venting closure 144 may each be attached to an actuator 172. First venting closure 132 and second venting closure 144 may be communicatively connected to actuators 172 including a conversion mechanism for converting an electrical signal to a mechanical signal. System 100 may include actuators 172 communicatively connected to and configured to move first venting closure 132 and second venting closure 144 from open position to closed position and from closed position to open position. In one or more embodiments, actuators 172 may include pneumatic pistons, hydraulic pistons, and/or solenoid pistons. In some embodiments, actuators 172 may use electrical components. For example, actuators 172 may each include a hydraulic piston 176 that extends or retracts to first venting closure 132 and second venting closure 144 causing them to open or shut. In another example, actuators 172 may each include a solenoid. Similarly, actuators 172 may be triggered by electrical power, pneumatic pressure, hydraulic pressure, or the like. Actuators 172 may also include electrical motors, servomotors, cables, and the like, as discussed further below. System 100 may include a pilot control 180 communicatively connected to actuators 172 and configured to generate a command to the actuators 172, namely to open or close first venting closure 132 and/or second venting closure 144. Pilot control 180 may include a pilot interfacing component including, but not limited to, a button, toggle, or switch that affects an electric signal to the corresponding one or more actuators 172 to open or close first venting closure 132 and/or second venting closure 144. Pilot control 180 may be physically located in the cockpit of electric aircraft 108 or remotely located outside of the electric aircraft 108 in another location communicatively connected to at least a portion of the electric aircraft 108.

With continued reference to FIGS. 1A-1C, system 100 may include a computing device 184. Computing device 184 may include any computing device as described in this disclosure, including without limitation a microcontroller, microprocessor, digital signal processor (DSP) and/or system on a chip (SoC) as described in this disclosure. Computing device 184 may include, be included in, and/or communicate with a mobile device such as a mobile telephone or smartphone. Computing device 184 may include a single computing device operating independently, or may include two or more computing device operating in concert, in parallel, sequentially or the like; two or more computing devices may be included together in a single computing device or in two or more computing devices. Computing device 184 may interface or communicate with one or more additional devices as described below in further detail via a network interface device. Network interface device may be utilized for connecting computing device 184 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 184 may include but is not limited to, for example, a computing device or cluster of computing devices in a first location and a second computing device or cluster of computing devices in a second location. Computing device 184 may include one or more computing devices dedicated to data storage, security, distribution of traffic for load balancing, and the like. Computing device 184 may distribute one or more computing tasks as described below across a plurality of computing devices of computing device, which may operate in parallel, in series, redundantly, or in any other manner used for distribution of tasks or memory between computing devices. Computing device 184 may be implemented using a "shared nothing" architecture in which data is cached at the worker, in an embodiment, this may enable scalability of system 100 and/or computing device.

With continued reference to FIGS. 1A-1C, computing device 184 may be designed and/or configured to perform any method, method step, or sequence of method steps in any embodiment described in this disclosure, in any order and with any degree of repetition. For instance, computing device 184 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 184 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIGS. 1A-1C, actuators 172 may incorporate and/or be communicatively connected to a computing device 184 or plurality of computing devices consistent with the entirety of this disclosure. System 100 may include a sensor 188 that is communicatively connected to pilot control 180 and actuators 172. As used in this disclosure, "sensor" may refer to one or more sensors. Sensor 188, as described in this disclosure, are any device, module, and/or subsystems, utilizing any hardware, software, and/or any combination thereof to detect events and/or changes in the instant environment and communicate the information to the vehicle controller. Sensor 188 may be mechanically and/or communicatively connected, as described above, to electric aircraft 108. Sensor 188 may be incorporated into electric aircraft 108 or be remote. In one or more embodiments, sensor 188 may include, as an example and without limitation, an environmental sensor. As used herein, an environmental sensor may be used to detect ambient temperature, barometric pressure, air velocity, motion sensors which may include gyroscopes, accelerometers, inertial measurement unit (IMU), various magnetic, humidity, and/or oxygen. As another non-limiting example, sensor 188 may include a geospatial sensor. As used in this disclosure, a geospatial sensor may include optical/radar/Lidar, GPS, and may be used to detect electric aircraft 108 location, electric aircraft 108 speed, electric aircraft 108 altitude and whether the electric aircraft 108 is on the correct location of the flight plan. Sensor 188 may be located inside aircraft. Sensor 188 may be inside a component of electric aircraft 108. In an embodiment, an environmental sensor may sense one or more environmental conditions or parameters outside electric aircraft 108, inside the electric aircraft 108, or within or at any component thereof, including without limitation an energy source, a propulsor, or the like. The environmental sensor may further collect environmental information from the predetermined landing site, such as ambient temperature, barometric pressure, air velocity, motion sensors which may include gyroscopes, accelerometers, inertial measurement unit (IMU), various magnetic, humidity, and/or oxygen. The information may be collected from outside databases and/or information services, such as Aviation Weather Information Services. Sensor 188 may detect an environmental parameter, a temperature, a barometric pressure, a location parameter, and/or other necessary measurements. Sensor 188 may detect voltage, current, or other electrical connection via a direct method or by calculation. This may be accomplished, for instance, using an analog-to-digital converter, one or more comparators, or any other components usable to detect electrical parameters using an electrical connection that may occur to any person skilled in the art upon reviewing the entirety of this disclosure. Persons skilled in the art, upon reviewing the entirety of this disclosure, will be aware of various ways to monitor the status of the system of both critical and non-critical functions.

With continued reference to FIGS. 1A-1C, actuators 172 may be configured to move first venting closure 132 and second venting closure 144 to the open position when a triggering event occurs. As used in this disclosure, a "triggering event" is an event that is measurable by sensor 188 and is programmed in a computing device to command movement of the venting closures to the open position or closed position. Triggering event may also be pre-programmed in computing device 184 and may also be programmable to alter or create a triggering event. Triggering event may be, for example without limitation, when sensor 188 detects HV cable 104 or cable compartment 120 is above or below a specified temperature, when sensor 188 detects electric aircraft 108 has reached its destination in a flight plan, when sensor 188 detects battery pack is charging, and when sensor 188 detects the presence or a specified concentration of one or more gaseous fumes in cable compartment 120. For example, first venting closure 132 and second venting closure 144 may be triggered when the temperature of cable compartment 120 exceeds a specified temperature and the first venting closure 132 and the second venting closure 144 may be triggered to close when the temperature of cable compartment 120 decreases below another specified temperature. In some embodiments, if the opening of first venting closure 132 and/or second venting closure 144 is triggered by a temperature status, computing device 184 may be configured to activate a warning to alert a user if the temperature does not decrease below a specified temperature.

Figure 2:
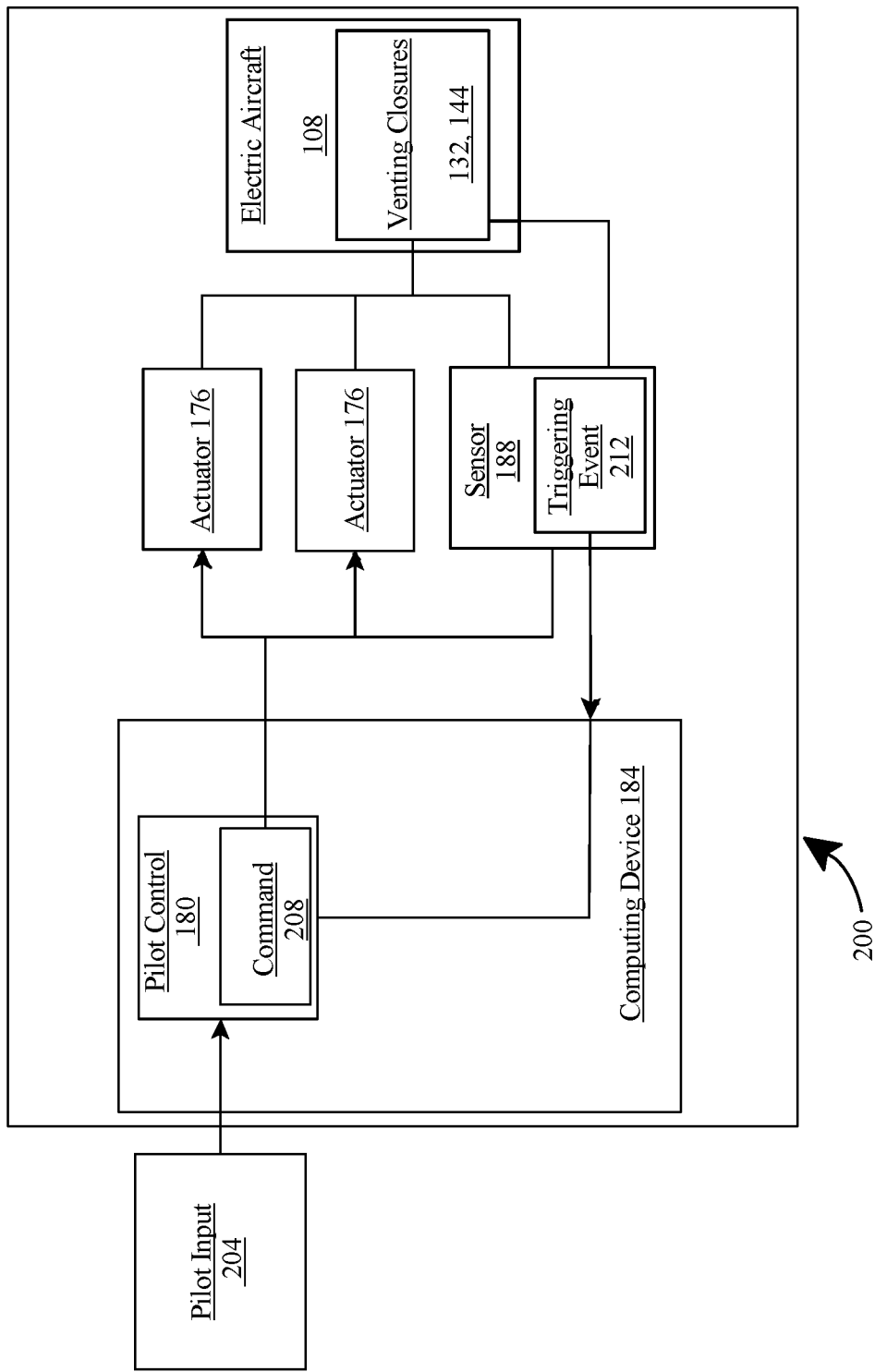
FIG. 2 is a block diagram illustrating an embodiment of a system for cooling a HV cable on an electric aircraft.

Referring now to FIG. 2, an exemplary system 200 of an embodiment of the present disclosure is illustrated. Pilot control 180 may be configured to receive pilot input 204. Pilot input 204 may include one or more data sources providing raw data. "Raw data", for the purposes of this disclosure, is data representative of aircraft information that has not been conditioned, manipulated, or processed in a manner that renders data unrepresentative of aircraft information. In exemplary embodiments, pilot input 204 may be provided by a pilot or an automation system. Pilot input 204 may be exterior sensor data, interior sensor data, data retrieved from one or more remotely or onboard computing devices. Pilot input 204 may include audiovisual data, pilot voice data, biometric data, or a combination thereof. Pilot input 204 may include information or raw data gathered from gyroscopes, inertial measurement units (IMUs), motion sensors, a combination thereof, or another sensor or grouping of sensors. Computing device 184 may be communicatively connected to pilot control 180, actuators 172, sensor 188, and first venting closure 132, and second venting closure 144. Actuators 172 may be communicatively connected to pilot control 180 and configured to receive command from the pilot control 180 and simultaneously actuate to move first venting closure 132 and/or second venting closure 144. For example, different types of command may move first venting closure 132 to the open position, move the first venting closure 132 to the closed position, move second venting closure 144 to the open position, or move the second venting closure 144 to the closed position. Other types of command may open or close both first venting closure 132 and second venting closure 144. Pilot input 204 may include a physical manipulation of a control, such as a pilot using a hand and arm to push or pull a lever, or a pilot using a finger to manipulate a switch. Pilot input 204 may include a voice command by a pilot to a microphone and computing system consistent with the entirety of this disclosure. Pilot control 180 is configured to generate command as a function of pilot input 204. Pilot control 180 may be communicatively connected to any other component presented in system. The communicative connections may include redundant connections configured to safeguard against single-point failure. Pilot control 180 may include circuitry, computing devices, electronic components, or a combination thereof that translate pilot input 204 into at least an electronic signal, such as command 208 to command actuators 172 to move first venting closure 132 and/or second venting closure 144 on electric aircraft 108 to the open position or closed position, configured to be transmitted to another electronic component. Computing device 184 may initial command 208 once it receives communication from sensor 188 that a triggering event 212 has occurred. Triggering event may include any triggering event discussed herein.

Figure 3:
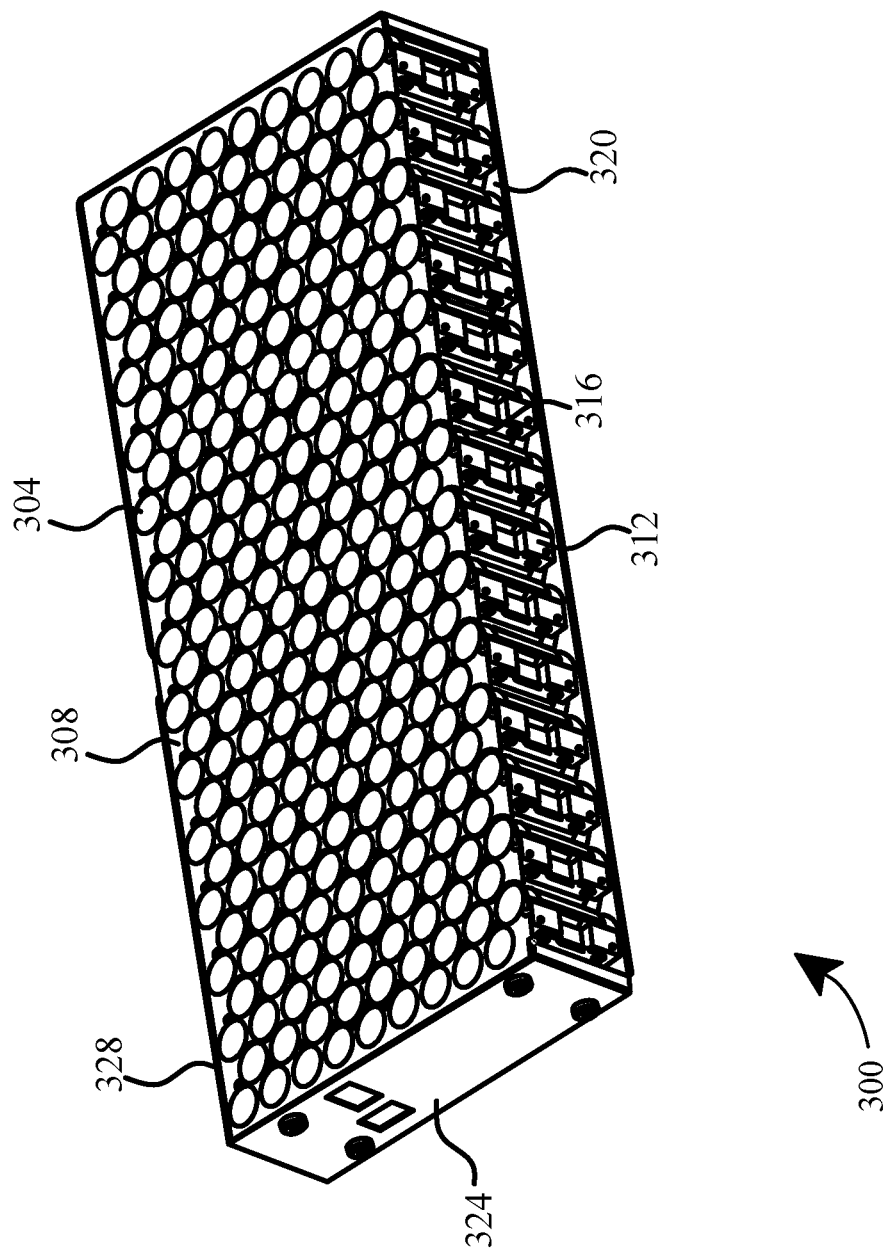
FIG. 3 is a schematic view of an exemplary battery module.

Referring now to FIG. 3, an exemplary embodiment of a battery module 300 with multiple battery units 316 is illustrated, according to embodiments. Battery module 300 may comprise a battery cell 304, cell retainer 308, cell guide 312, protective wrapping, back plate 320, end cap 324, and side panel 328. Battery module 300 may comprise a plurality of battery cells, an individual of which is labeled 304. In embodiments, battery cells 304 may be disposed and/or arranged within a respective battery unit 316 in groupings of any number of columns and rows. For example, in the illustrative embodiment of FIG. 3, battery cells 304 are arranged in each respective battery unit 316 with 18 cells in two columns. It should be noted that although the illustration may be interpreted as containing rows and columns, that the groupings of battery cells in a battery unit, that the rows are only present as a consequence of the repetitive nature of the pattern of staggered battery cells and battery cell holes in cell retainer being aligned in a series. While in the illustrative embodiment of FIG. 3 battery cells 304 are arranged 18 to battery unit 316 with a plurality of battery units 316 comprising battery module 300, one of skill in the art will understand that battery cells 304 may be arranged in any number to a row and in any number of columns and further, any number of battery units may be present in battery module 300. According to embodiments, battery cells 304 within a first column may be disposed and/or arranged such that they are staggered relative to battery cells 304 within a second column. In this way, any two adjacent rows of battery cells 304 may not be laterally adjacent but instead may be respectively offset a predetermined distance. In embodiments, any two adjacent rows of battery cells 304 may be offset by a distance equal to a radius of a battery cell. This arrangement of battery cells 304 is only a non-limiting example and in no way preclude other arrangement of battery cells.

In embodiments, battery cells 304 may be fixed in position by cell retainer 308. For the illustrative purposed within FIG. 3, cell retainer 308 is depicted as the negative space between the circles representing battery cells 304. Cell retainer 308 comprises a sheet further comprising circular openings that correspond to the cross-sectional area of an individual battery cell 304. Cell retainer 308 comprises an arrangement of openings that inform the arrangement of battery cells 304. In embodiments, cell retainer 308 may be configured to non-permanently, mechanically couple to a first end of battery cell 304.

According to embodiments, battery module 300 may further comprise a plurality of cell guides 312 corresponding to each battery unit 316. Cell guide 312 may comprise a solid extrusion with cutouts (e.g. scalloped) corresponding to the radius of the cylindrical battery cell 304. Cell guide 312 may be positioned between the two columns of a battery unit 316 such that it forms a surface (e.g. side surface) of the battery unit 316. In embodiments, the number of cell guides 312 therefore match in quantity to the number of battery units 316. Cell guide 312 may comprise a material suitable for conducting heat.

Battery module 300 may also comprise a protective wrapping woven between the plurality of battery cells 304. Protective wrapping may provide fire protection, thermal containment, and thermal runaway during a battery cell malfunction or within normal operating limits of one or more battery cells 304 and/or potentially, battery module 300 as a whole. Battery module 300 may also comprise a backplate 320. Backplate 320 is configured to provide structure and encapsulate at least a portion of battery cells 304, cell retainers 308, cell guides 312, and protective wraps. End cap 324 may be configured to encapsulate at least a portion of battery cells 304, cell retainers 308, cell guides 312, and battery units 316, as will be discussed further below, end cap may comprise a protruding boss that clicks into receivers in both ends of back plate 320, as well as a similar boss on a second end that clicks into sense board. Side panel 328 may provide another structural element with two opposite and opposing faces and further configured to encapsulate at least a portion of battery cells 304, cell retainers 308, cell guides 312, and battery units 316.

Still referring to FIG. 3, in embodiments, battery module 300 can include one or more battery cells 304. In another embodiment, battery module 300 comprises a plurality of individual battery cells 304. Battery cells 304 may each comprise a cell configured to include an electrochemical reaction that produces electrical energy sufficient to power at least a portion of electric aircraft. Battery cell 304 may include electrochemical cells, galvanic cells, electrolytic cells, fuel cells, flow cells, voltaic cells, or any combination thereof—to name a few. In embodiments, battery cells 304 may be electrically connected in series, in parallel, or a combination of series and parallel. Series connection, as used herein, comprises wiring a first terminal of a first cell to a second terminal of a second cell and further configured to comprise a single conductive path for electricity to flow while maintaining the same current (measured in Amperes) through any component in the circuit. Battery cells 304 may use the term 'wired', but one of ordinary skill in the art would appreciate that this term is synonymous with 'electrically connected', and that there are many ways to couple electrical elements like battery cells 304 together. As an example, battery cells 304 can be coupled via prefabricated terminals of a first gender that mate with a second terminal with a second gender. Parallel connection, as used herein, comprises wiring a first and second terminal of a first battery cell to a first and second terminal of a second battery cell and further configured to comprise more than one conductive path for electricity to flow while maintaining the same voltage (measured in Volts) across any component in the circuit. Battery cells 304 may be wired in a series-parallel circuit which combines characteristics of the constituent circuit types to this combination circuit. Battery cells 304 may be electrically connected in any arrangement which may confer onto the system the electrical advantages associated with that arrangement such as high-voltage applications, high-current applications, or the like.

As used herein, an electrochemical cell is a device capable of generating electrical energy from chemical reactions or using electrical energy to cause chemical reactions. Further, voltaic or galvanic cells are electrochemical cells that generate electric current from chemical reactions, while electrolytic cells generate chemical reactions via electrolysis. As used herein, the term 'battery' is used as a collection of cells connected in series or parallel to each other.

According to embodiments and as discussed above, any two rows of battery cells 304 and therefore cell retainer 308 openings are shifted one half-length so that no two battery cells 304 are directly next to the next along the length of the battery module 300, this is the staggered arrangement presented in the illustrated embodiment of FIG. 3. Cell retainer 308 may employ this staggered arrangement to allow more cells to be disposed closer together than in square columns and rows like in a grid pattern. The staggered arrangement may also be configured to allow better thermodynamic dissipation, the methods of which may be further disclosed hereinbelow. Cell retainer 308 may comprise staggered openings that align with battery cells 304 and further configured to hold battery cells 304 in fixed positions. Cell retainer 308 may comprise an injection molded component. Injection molded component may comprise a component manufactured by injecting a liquid into a mold and letting it solidify, taking the shape of the mold in its hardened form. Cell retainer 308 may comprise liquid crystal polymer, polypropylene, polycarbonate, acrylonitrile butadiene styrene, polyethylene, nylon, polystyrene, polyether ether ketone, to name a few. Cell retainer 308 may comprise a second cell retainer fixed to the second end of battery cells 304 and configured to hold battery cells 304 in place from both ends. The second cell retainer may comprise similar or the exact same characteristics and functions of first cell retainer 308. Battery module 300 may also comprise cell guide 312. Cell guide 312 includes material disposed in between two rows of battery cells 304. In embodiments, cell guide 312 can be configured to distribute heat that may be generated by battery cells 304.

According to embodiments, battery module 300 may also comprise back plate 320. Back plate 320 is configured to provide a base structure for battery module 300 and may encapsulate at least a portion thereof. Backplate 320 can have any shape and includes opposite, opposing sides with a thickness between them. In embodiments, back plate 320 may comprise an effectively flat, rectangular prism shaped sheet. For example, back plate 320 can comprise one side of a larger rectangular prism which characterizes the shape of battery module 300 as a whole. Back plate 320 also comprises openings correlating to each battery cell 304 of the plurality of battery cells 304. Back plate 320 may comprise a lamination of multiple layers. The layers that are laminated together may comprise FR-4, a glass-reinforced epoxy laminate material, and a thermal barrier of a similar or exact same type as disclosed hereinabove. Back plate 320 may be configured to provide structural support and containment of at least a portion of battery module 300 as well as provide fire and thermal protection.

According to embodiments, battery module 300 may also comprise first end cap 324 configured to encapsulate at least a portion of battery module 300. End cap 324 may provide structural support for battery module 300 and hold back plate 320 in a fixed relative position compared to the overall battery module 300. End cap 324 may comprise a protruding boss on a first end that mates up with and snaps into a receiving feature on a first end of back plate 320. End cap 324 may comprise a second protruding boss on a second end that mates up with and snaps into a receiving feature on sense board.

Battery module 300 may also comprise at least a side panel 328 that may encapsulate two sides of battery module 300. Side panel 328 may comprise opposite and opposing faces comprising a metal or composite material. In the illustrative embodiment of FIG. 3, a second side panel 328 is present but not illustrated so that the inside of battery module 300 may be presented. Side panel(s) 328 may provide structural support for battery module 300 and provide a barrier to separate battery module 300 from exterior components within aircraft or environment.

Figure 4:
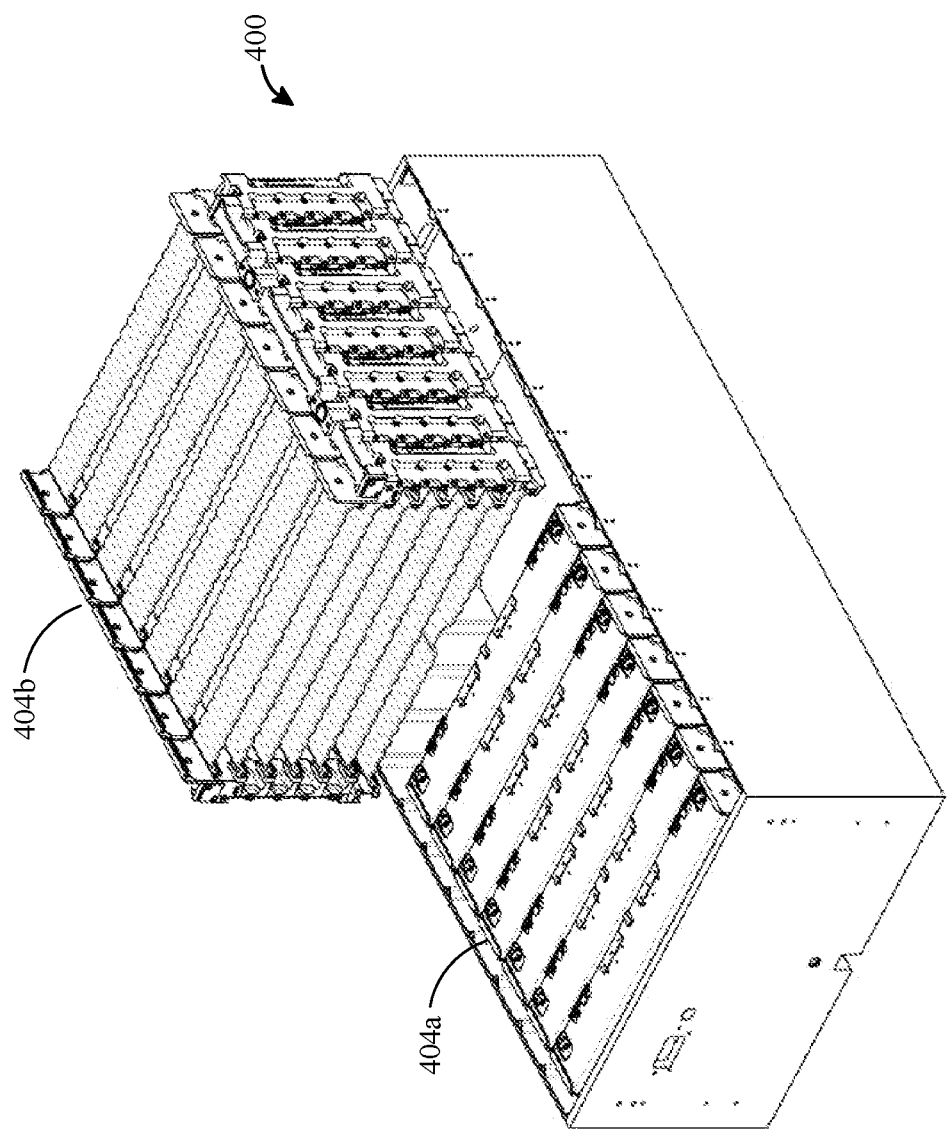
FIG. 4 is a schematic drawing of an exemplary aircraft battery pack having a cooling circuit.

Referring now to FIG. 4, schematically illustrates an exemplary aircraft battery 400, in an isometric view. In some cases, aircraft battery 400 includes at least a cooling circuit 404. FIG. 4 illustrates aircraft battery 400 with one cooling circuit installed 404a and one cooling circuit uninstalled 404b. In some embodiments, aircraft battery 400 may include two or more cooling circuits 404a-b. Cooling circuits may be configured to allow coolant flow proximal battery module. In some cases, a thermal gradient between coolant and battery modules cools aircraft battery 400. Aircraft battery 400 may be any type of battery described in this disclosure.

Figure 5:
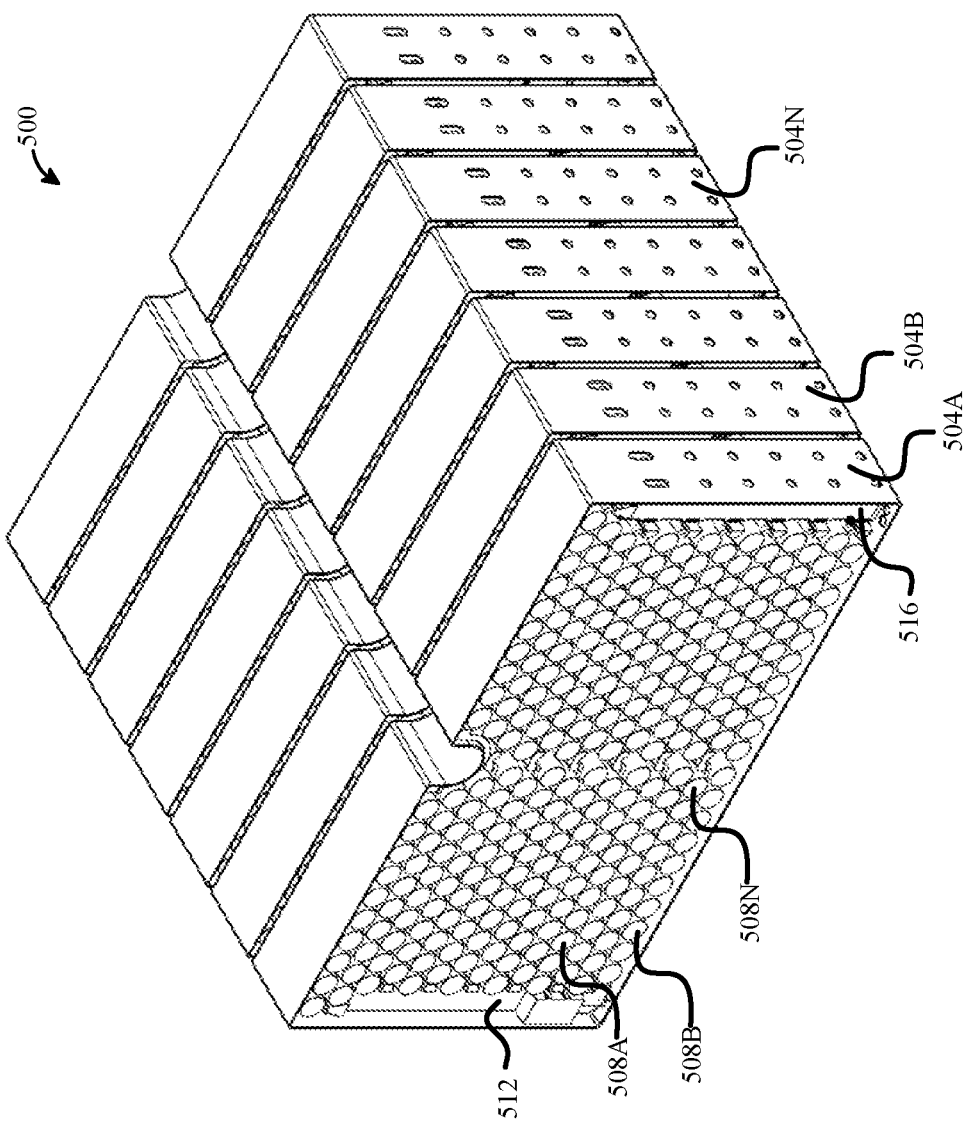
FIG. 5 is a perspective view of an exemplary battery pack.

Referring now to FIG. 5, a perspective drawing of an exemplary embodiment of a battery pack with a plurality of battery modules disposed therein 500. The configuration of battery pack 500 is merely exemplary and should in no way be considered limiting. Battery pack 500 is configured to facilitate the flow of the media through each battery module of the plurality of battery modules to cool the battery pack. Battery pack 500 can include one or more battery modules 504A-N. Battery pack 500 is configured to house and/or encase one or more battery modules 504A-N. Each battery module of the plurality of battery modules 504A-N may include any battery module as described in further detail in the entirety of this disclosure. As an exemplary embodiment, FIG. 5 illustrates 7 battery modules 504A-N creating battery pack 500, however, a person of ordinary skill in the art would understand that any number of battery modules 504A-N may be housed within battery pack 500. In an embodiment, each battery module of the plurality of battery modules 504A-N can include one or more battery cells 508A-N. Each battery module 504A-N is configured to house and/or encase one or more battery cells 508A-N. Each battery cell of the plurality of battery cells 508A-N may include any battery cell as described in further detail in the entirety of this disclosure. Battery cells 508A-N may be configured to be contained within each battery module 504A-N, wherein each battery cell 508A-N is disposed in any configuration without limitation. As an exemplary embodiment, FIG. 5 illustrates 240 battery cells 508A-N housed within each battery module 504A-N, however, a person of ordinary skill in the art would understand that any number of battery units 508A-N may be housed within each battery module 504A-N of battery pack 500. Further, each battery module of the plurality of battery modules 504A-N of battery pack 500 includes circuit 512. Circuit 512 may include any circuit as described in further detail in the entirety of this disclosure. Each battery module of the plurality of battery modules 504A-N further includes second circuit 516. Second circuit 516 may include any circuit as described in further detail in the entirety of this disclosure. Persons skilled in the art, upon reviewing the entirety of this disclosure, will be aware of various configurations of the plurality of battery modules that may be utilized for the battery pack consistently with this disclosure.

With continued reference to FIG. 5, according to some embodiments, a battery unit may be configured to couple to one or more other battery units, wherein the combination of two or more battery units forms at least a portion of vehicle battery and/or charging battery. Battery unit may be configured to include a plurality of battery cells. The plurality of battery cells may include any battery cell as described in the entirety of this disclosure. In the instant embodiment, for example and without limitation, battery unit includes a first row of battery cells, wherein first row of battery cells is in contact with the first side of the thermal conduit, as described in further detail below. As a non-limiting example, row of battery cells is configured to contain ten columns of battery cells. Further, in the instant embodiment, for example and without limitation, battery unit includes a second row of battery cells, wherein second row of battery cells is in contact with the second side of the thermal conduit, as described in further detail below. As a non-limiting example, second row of battery cells is configured to contain ten columns of battery cells. In some embodiments, battery unit may be configured to contain twenty battery cells in first row and second row. Battery cells of battery unit may be arranged in any configuration, such that battery unit may contain any number of rows of battery cells and any number of columns of battery cells. In embodiments, battery unit may contain any offset of distance between first row of battery cells and second row of battery cells, wherein the battery cells of first row and the battery cells of second row are not centered with each other. In the instant embodiment, for example and without limitation, battery unit includes first row and adjacent second row each containing ten battery cells, each battery cell of first row and each battery cell of second row are shifted a length measuring the radius of a battery cell, wherein the center of each battery cell of first row and each battery cell of second row are separated from the center of the battery cell in the adjacent column by a length equal to the radius of the battery cell. As a further example and without limitation, each battery cell of first row and each battery cell of second row are shifted a length measuring a quarter the diameter of each battery cell, wherein the center of each battery cell of first row and each battery cell of second row are separated from the center of a battery cell in the adjacent column by a length equal to a quarter of the diameter of the battery cell. First row of battery cells and second row of battery cells of the at least a battery unit may be configured to be fixed in a position by utilizing a cell retainer, as described in the entirety of this disclosure. Each battery cell may be connected utilizing any means of connection as described in the entirety of this disclosure. In some embodiments, battery unit can include thermal conduit, wherein thermal conduit has a first surface and a second opposite and opposing surface. In some cases, height of thermal conduit may not exceed the height of battery cells, as described in the entirety of this disclosure. For example and without limitation, thermal conduit may be at a height that is equal to the height of each battery cell of first row and second row. Thermal conduit may be composed of any suitable thermally conductive material. Thermal conduit is configured to include an indent in the component for each battery cell coupled to the first surface and/or the second surface of thermal conduit. Persons skilled in the art, upon reviewing the entirety of this disclosure, will be aware of components that may be used as thermal conduits consistently with this disclosure.

Continuing with reference to FIG. 5, thermal conduit may include at least a passage, wherein the at least a passage comprises an opening starting at the first end of thermal conduit and terminating at a second, opposing end of thermal conduit. The "passage", as described herein, is a horizontal channel with openings on each end of the thermal conduit. The at least a passage may be configured to have a hollow shape comprising one or more sides, at least two ends (e.g. a top and a bottom), and a length, wherein the hollow shape comprises a void having a shape the same as or different from the shape of the at least a passage and terminating at an opposite, opposing second end of the shape. For example and without limitation, in some embodiments, the at least a passage comprises a rectangle shaped tubular shape. In embodiments, the tubular component runs effectively perpendicular to each battery cell. In embodiments, the at least a passage can be disposed such that it forms a void originating at a first side of the battery module and terminating at the second, opposite, and opposing side, of the battery module. According to embodiments, the at least a passage and/or thermal conduit may be composed utilizing any suitable material. For example and without limitation, thermal conduit and/or the at least a passage may be composed of polypropylene, polycarbonate, acrylonitrile butadiene styrene, polyethylene, nylon, polystyrene, polyether ether ketone, and the like.

Still referring to FIG. 5, the at least a passage may be disposed in the thermal conduit such that the at least a passage is configured to allow the travel of a media from a first end of thermal conduit to the second, opposite, and opposite end of thermal conduit. For example, the at least a passage can be disposed to allow the passage of the media through the hollow opening/void of the at least a passage. The media may include any media as described in the entirety of this disclosure. The hollow opening of thermal conduit and/or the at least a passage may be configured to be of any size and/or diameter. For example and without limitation, the hollow opening of the at least a passage may be configured to have a diameter that is equal to or less than the radius of each battery cell. The at least a passage and/or thermal conduit may have a length equal or less than the length of one row of battery cells such that thermal conduit and/or the at least a passage is configured to not exceed the length of first row and/or second row of battery cells. The opening of the at least a passage can be configured to be disposed at each end of thermal conduit, wherein the at least a passage may be in contact with each battery cell in a respective battery unit located at the end of each column and/or row of the battery unit. For example and without limitation, in some embodiments, a battery unit can contain two rows with ten columns of battery cells and the opening of the at least a passage on each end of thermal conduit that is in contact with a respective battery cell at the end of each of the two columns. Persons skilled in the art, upon reviewing the entirety of this disclosure, will be aware of various components that may be used as at least a passage consistently with this disclosure.

With continued reference to FIG. 5, in some embodiments, circuit and/or thermal conduit may be configured to facilitate the flow of the media through each battery module of the plurality of battery modules to cool the battery pack. The media may include any media as described in further detail in the entirety of this disclosure. Circuit can include any circuit as described above in further detail. In the embodiment, circuit may be configured to couple to a first end of thermal conduit, wherein coupling is configured to facilitate the flow of the media from the circuit to the first end of thermal conduit through the at least a passage. Coupling may include any coupling as described in further detail throughout the entirety of this disclosure. Circuit may include any component configured to facilitate the flow of media to the battery pack by utilizing an electrical current. For example and without limitation, circuit may include a printed circuit board, wherein the printed circuit board mechanically supports the electrical connection facilitating the flow of media to the battery pack. Circuit may be configured to include first end and a second end, wherein the second end is opposite the first end of circuit 1000. In some embodiments, first end of circuit is in a plane perpendicular to the longitudinal axis of thermal conduit. First end of circuit is configured to include media feed component. The embodiment of circuit illustrates media feed component disposed only on first side of circuit; however, this is non-limiting and circuit may include media feed component disposed on the second end of circuit. The media feed component of circuit may be configured to allow the media to feed into circuit, the battery module and/or the battery pack, wherein the flow of media may be initiated as a function of coupling media feed component of circuit to the media feeder of the thermal management apparatus. Media feed component can include any media feed component as described in further detail above. In some embodiments, media feed component is a threaded hole, wherein the media feeder of the thermal management apparatus is configured to couple to the threaded hole of media feed component, however this is non-limiting and media feed component may include, without limitation, a magnetic component, a latching mechanism, a pressure fit tubing mechanism, a nozzle mechanism, a hole, a flap, and the like.

Continuing with reference to FIG. 5, thermal conduit can include any thermal conduit as described in further detail above. The height of thermal conduit may not exceed the height of each battery cell of the plurality of battery cells, in some cases, as described in the entirety of this disclosure. Thermal conduit may be composed of any suitable material, as described above in further detail above. Thermal conduit may be configured to include any curvature of the first side and/or second side of thermal conduit. For example and without limitation the curvature of the first side and/or second side of thermal conduit correlates at least a portion of a battery cell of the plurality of battery cells. As a further example and without limitation, in an embodiment, thermal conduit may be configured to include ten curves of the first surface of thermal conduit, wherein each curve is configured to contain the at least a portion of each battery cell of the plurality of battery cells adjacent to the first surface of thermal conduit. As a further example and without limitation, in some embodiments, thermal conduit may be configured to include ten curves on the second surface of thermal conduit wherein each curve may be configured to contain the at least a portion of each battery cell of the plurality of battery cells adjacent to the second surface of thermal conduit. The embodiment of thermal conduit illustrates ten curves on each surface of thermal conduit; however, this is non-limiting and thermal conduit may include any number of curves on each surface of thermal conduit, wherein each curve corresponds to the at least a portion of a battery cell of the plurality of battery cells.

Still referring to FIG. 5, in some embodiments, thermal conduit may include any thermal conduit as described in further detail above. As described in further detail above, thermal conduit may be composed of any suitable material. Further, thermal conduit may be configured to include any curvature of the first side and/or second side of the thermal conduit, as described in further detail above. Thermal conduit may be configured to at least a passage. The at least a passage can include any at least a passage as described in further detail above. The at least a passage is configured to have a hollow shape comprising one or more sides, at least two ends (e.g. a top and a bottom), and a length, wherein the hollow shape comprises a void having a shape the same as or different from the shape of the at least a passage and terminating at an opposite, opposing second end of the shape, as described above in further detail above. For example and without limitation, in the illustrative embodiment, the at least a passage comprise a rectangle shaped tubular shape. In embodiments, the tubular component runs effectively perpendicular to each battery cell and/or curvature of thermal conduit configured to house each battery cell. In embodiments, the at least a passage can be disposed such that it forms a void originating at a first side of the battery module and terminating at the second, opposite, and opposing side, of the battery module, as described in further detail in the entirety of this disclosure. According to embodiments, the at least a passage and/or thermal conduit may be composed utilizing any suitable material, as described in further detail above. In embodiments, the at least a passage may be disposed in the thermal conduit such that the at least a passage may be configured to allow the travel of a media from a first end of thermal conduit to the second, opposite, and opposite end of thermal conduit, as described in further detail in the entirety of this disclosure.

With continued reference to FIG. 5, any of the disclosed components or systems, namely battery pack 500, battery modules 504A-N, and/or battery cells 508A-N may incorporate provisions to dissipate heat energy present due to electrical resistance in integral circuit. The presence of heat energy in a power system is potentially dangerous by introducing energy possibly sufficient to damage mechanical, electrical, and/or other systems present in at least a portion of exemplary electric aircraft. Battery pack may include mechanical design elements, one of ordinary skill in the art, may thermodynamically dissipate heat energy away from battery pack. The mechanical design may include, but is not limited to, slots, fins, heat sinks, perforations, a combination thereof, or another undisclosed element. Heat dissipation may include material selection beneficial to move heat energy in a suitable manner for operation of battery pack. Certain materials with specific atomic structures and therefore specific elemental or alloyed properties and characteristics may be selected in construction of battery pack to transfer heat energy out of a vulnerable location or selected to withstand certain levels of heat energy output that may potentially damage an otherwise unprotected component. One of ordinary skill in the art, after reading the entirety of this disclosure would understand that material selection may include titanium, steel alloys, nickel, copper, nickel-copper alloys such as Monel, tantalum and tantalum alloys, tungsten and tungsten alloys such as Inconel, a combination thereof, or another undisclosed material or combination thereof. Heat dissipation may include a combination of mechanical design and material selection. The responsibility of heat dissipation may fall upon the material selection and design as disclosed above in regard to any component disclosed in this paper. The battery pack may include similar or identical features and materials ascribed to battery pack in order to manage the heat energy produced by these systems and components.

Figure 6:
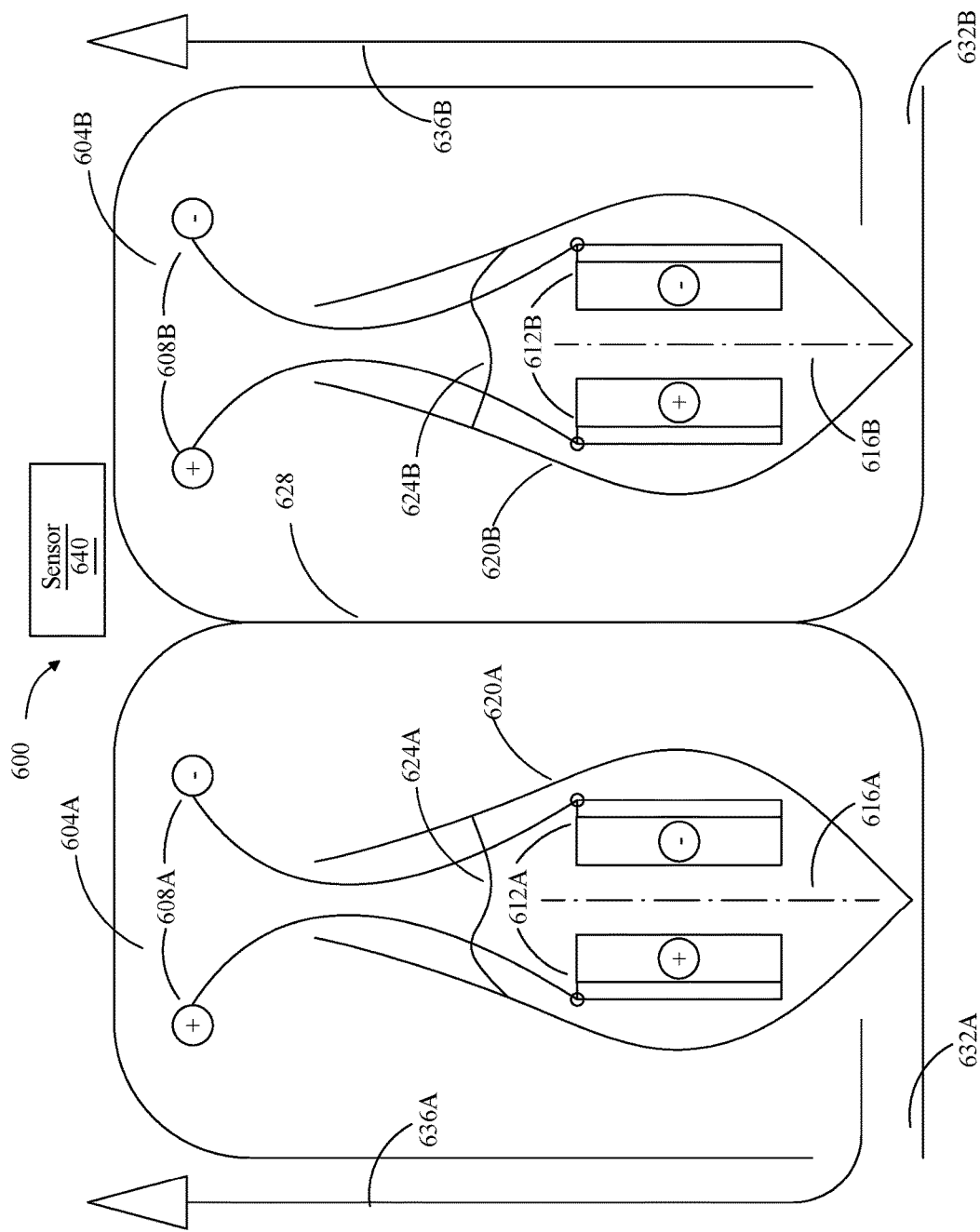
FIG. 6 is a schematic drawing of an exemplary battery pack for preventing progression of thermal runaway between modules.

Referring now to FIG. 6, an exemplary battery pack 600 for preventing progression of thermal runaway between modules is illustrated. Battery pack 600 may include a pouch cell 604A-B. As used in this disclosure, "pouch cell" is a battery cell or module that includes a pouch. In some cases, a pouch cell may include or be referred to as a prismatic pouch cell, for example when an overall shape of pouch is prismatic. In some cases, a pouch cell may include a pouch which is substantially flexible. Alternatively or additionally, in some cases, pouch may be substantially rigid. Pouch cell 604A-B may include at least a pair of electrodes 608A-B. At least a pair of electrodes 608A-B may include a positive electrode and a negative electrode. Each electrode of at least a pair of electrodes 608A-B may include an electrically conductive element. Non-limiting exemplary electrically conductive elements include braided wire, solid wire, metallic foil, circuitry, such as printed circuit boards, and the like. At least a pair of electrodes 608A-B may be in electric communication with and/or electrically connected to at least a pair of foil tabs 612A-B. At least a pair of electrodes 608A-B may be bonded in electric communication with and/or electrically connected to at least a pair of foil tabs 612A-B by any known method, including without limitation welding, brazing, soldering, adhering, engineering fits, electrical connectors, and the like. In some cases, at least a pair of foil tabs may include a cathode and an anode. In some cases, an exemplary cathode may include a lithium-based substance, such as lithium-metal oxide, bonded to an aluminum foil tab. In some cases, an exemplary anode may include a carbon-based substance, such as graphite, bonded to a copper tab. A pouch cell 604A-B may include an insulator layer 616A-B. As used in this disclosure, an "insulator layer" is an electrically insulating material that is substantially permeable to battery ions, such as without limitation lithium ions. In some cases, insulator layer may be referred to as a separator layer or simply separator. In some cases, insulator layer 616A-B is configured to prevent electrical communication directly between at least a pair of foil tabs 612A-B (e.g., cathode and anode). In some cases, insulator layer 616A-B may be configured to allow for a flow ions across it. Insulator layer 616A-B may consist of a polymer, such as without limitation polyolifine (PO). Insulator layer 616A-B may comprise pours which are configured to allow for passage of ions, for example lithium ions. In some cases, pours of a PO insulator layer 616A-B may have a width no greater than 100 μm, 10 μm, or 0.1 μm. In some cases, a PO insulator layer 616A-B may have a thickness within a range of 1-100 μm, or 10-50 μm.

With continued reference to FIG. 6, pouch cell 604A-B may include a pouch 620A-B. Pouch 620A-B may be configured to substantially encompass at least a pair of foil tabs 612A-B and at least a portion of insulator layer 616A-B. In some cases, pouch 620A-B may include a polymer, such as without limitation polyethylene, acrylic, polyester, and the like. In some case, pouch 620A-B may be coated with one or more coatings. For example, in some cases, pouch may have an outer surface coated with a metalizing coating, such as an aluminum or nickel containing coating. In some cases, pouch coating be configured to electrically ground and/or isolate pouch, increase pouches impermeability, increase pouches resistance to high temperatures, increases pouches thermal resistance (insulation), and the like. An electrolyte 624A-B is located within pouch. In some cases, electrolyte 624A-B may comprise a liquid, a solid, a gel, a paste, and/or a polymer. Electrolyte may wet or contact one or both of at least a pair of foil tabs 612A-B.

With continued reference to FIG. 6, battery pack 600 may additionally include an ejecta barrier 628. Ejecta barrier may be located substantially between a first pouch cell 604A and a second pouch cell 604B. As used in this disclosure, an "ejecta barrier" is any material or structure that is configured to substantially block, contain, or otherwise prevent passage of ejecta. As used in this disclosure, "ejecta" is any material that has been ejected, for example from a battery cell. In some cases, ejecta may be ejected during thermal runaway of a battery cell. Alternatively or additionally, in some cases, eject may be ejected without thermal runaway of a battery cell. In some cases, ejecta may include lithium-based compounds. Alternatively or additionally, ejecta may include carbon-based compounds, such as without limitation carbonate esters. Ejecta may include matter in any phase or form, including solid, liquid, gas, vapor, and the like. In some cases, ejecta may undergo a phase change, for example ejecta may be vaporous as it is initially being ejected and then cool and condense into a solid or liquid after ejection. In some cases, ejecta barrier may be configured to prevent materials ejected from first pouch cell 604A from coming into contact with second pouch cell 604B. For example, in some instances ejecta barrier 628 is substantially impermeable to ejecta from battery pouch cell 604A-B. In some embodiments, ejecta barrier 628 may include titanium. In some embodiments, ejecta barrier 628 may include carbon fiber. In some cases, ejecta barrier 628 may include at least a one of a lithiophilic or a lithiophobic material or layer, configured to absorb and/or repel lithium-based compounds. In some cases, ejecta barrier 628 may comprise a lithiophilic metal coating, such as silver or gold. In some cases, ejecta barrier 628 may be flexible and/or rigid. In some cases, ejecta barrier 628 may include a sheet, a film, a foil, or the like. For example in some cases, ejecta barrier may be between 25 and 5,000 micrometers thick. In some cases, an ejecta barrier may have a nominal thickness of about 2 mm. Alternatively or additionally, in some cases, an ejecta barrier may include rigid and/or structural elements, for instance which are solid. Rigid ejecta barriers 628 may include metals, composites and the like. In some cases, ejecta barrier 628 may be further configured to structurally support at least a pouch cell 628. For example in some cases, at least a pouch cell 628 may be mounted to a rigid ejecta barrier 628.

With continued reference to FIG. 6, battery pack 600 may additionally include at least a vent 632A-B. In some cases, at least a vent 632A may be configured to vent ejecta from first pouch cell 604A. In some cases, at least a vent 604A may be configured to vent ejecta along a flow path 636A. A flow path 636A may substantially exclude second pouch cell 604B, for example fluids such as gases liquids, or any material that acts as a gas or liquid, flowing along the flow path 636A may be cordoned away from contact with second pouch cell 604B. For example flow path 636A may be configured to not intersect with any surface of second pouch cell 604B. Flow path 636A-B may include any channel, tube, hose, conduit, or the like suitable for facilitating fluidic communication, for example with pouch cell 604A-B. In some cases, flow path 636A-B may include a check valve. As used in this disclosure, a "check valve" is a valve that permits flow of a fluid only in certain, for example one, direction. In some cases check valve may be configured to allow flow of fluids substantially only away from battery pouch cell 604A-B, while preventing back flow of vented fluid to the battery pouch cell 604A-B. In some cases, check valve may include a duckbill check valve. In some cases, a duckbill check valve may have lips which are substantially in a shape of a duckbill. Lips may be configured to open to allow forward flow (out of the lips), while remaining normally closed to prevent backflow (into the lips). In some cases, duckbill lips may be configured to automatically close (remain normally closed), for example with use of a compliant element, such as without limitation an elastomeric material, a spring, and the like. In some embodiments vent may include a mushroom poppet valve. In some cases, a mushroom poppet valve may include a mushroom shaped poppet. Mushroom shaped poppet may seal against a sealing element, for example a ring about an underside of a cap of the mushroom shaped poppet. In some cases, mushroom poppet valve may be loaded against sealing element, for example by way of a compliant element, such as a spring. According to some embodiments, vent 632A-B may have a vacuum applied to aid in venting of ejecta. Vacuum pressure differential may range from 0.1"Hg to 36"Hg.

With continued reference to FIG. 6, battery pack 600 may include a first battery pouch cell 604A and a second battery pouch cell 604B. First pouch cell 604A may include at least a first pair of electrodes 608A, at least a first pair of foil tabs 612A in electrical communication with the first electrodes 608A, at least a first insulator layer 616A located substantially between the at least a first pair of foil tabs 612A, a first pouch 620A substantially encompassing the at least a first pair of foil tabs 612A and at least a portion of the at least a first separator layer 616A, and a first electrolyte 624A within the first pouch 620A. Second pouch cell 604B may include at least a second pair of electrodes 608B, at least a second pair of foil tabs 612B in electrical communication with the first electrodes 608B, at least a second insulator 616B located substantially between the at least a first pair of foil tabs 612B, a second pouch 620B substantially encompassing the at least a second pair of foil tabs 612B and at least a portion of the at least a second insulator 616B, and a second electrolyte 624B within the second pouch 620B. Battery pack 600 may include an ejecta barrier 628 located substantially between first pouch cell 604A and second pouch cell 604B. Ejecta barrier 628 may be substantially impermeable to ejecta, for example ejecta from first pouch cell 604A. In some cases, battery pack 600 may include a vent configured to vent ejecta, for example from first pouch cell 604A. In some embodiments, ejecta barrier 628 may substantially encapsulates at least a portion of pouch cell 604A-B. For example, ejecta barrier 628 may substantially encapsulate first pouch cell 604A. In some cases, vent may be configured to provide fluidic communication through at least one of ejecta barrier 628 and pouch 620A-B. In some cases, vent may include a seam. Seam may be a seam of pouch 620A-B. Alternatively or additionally; seam may be a seam of ejecta barrier 628.

With continued reference to FIG. 6, in some embodiments battery pack 600 may additionally include a third pouch cell. Third pouch cell may include at least a third pair of electrodes, at least a third pair of foil tabs welded to the third electrodes, at least a third insulator layer located substantially between the at least a third pair of foil tabs, a third pouch substantially encompassing the at least a third pair of foil tabs and the at least a third separator layer, and a third electrolyte within the third pouch. Battery pack may include a plurality including any number of pouch cells. In some cases, each pouch cell of plurality of pouch cells is separated from adjacent pouch cells with at least an ejecta barrier 628. Any pouch cell of plurality of pouch cells in battery pack may include any component described in this disclosure, for example without limitation vents, valves, and the like.

Still referring to FIG. 6, in some embodiments, pouch cells 604A-B may include Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon, tin nanocrystals, graphite, graphene or titanate anode, or the like. Batteries and/or battery modules may include without limitation batteries using nickel-based chemistries such as nickel cadmium or nickel metal hydride, batteries using lithium-ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), batteries using lithium polymer technology, metal-air batteries. Pouch cells 604A-B may include lead-based batteries such as without limitation lead acid batteries and lead carbon batteries. Pouch cells 604A-B may include lithium sulfur batteries, magnesium ion batteries, and/or sodium ion batteries. Batteries may include solid state batteries or supercapacitors or another suitable energy source. Batteries may be primary or secondary or a combination of both. Additional disclosure related to batteries and battery modules may be found in co-owned U.S. Patent Applications entitled "SYSTEM AND METHOD FOR HIGH ENERGY DENSITY BATTERY MODULE" and "SYSTEMS AND METHODS FOR RESTRICTING POWER TO A LOAD TO PREVENT ENGAGING CIRCUIT PROTECTION DEVICE FOR AN AIRCRAFT," having U.S. patent application Ser. Nos. 16/948,140 and 16/590,496 respectively; the entirety of both applications are incorporated herein by reference. Persons skilled in the art, upon reviewing the entirety of this disclosure, will be aware of various devices of components that may be used as a battery module. In some cases, battery pack 600 is constructed in a manner that vents ejecta, while preventing ejecta from one pouch cell from interacting with another pouch cell.

With continued reference to FIG. 6, battery pack 600 may include at least a sensor 640. At least a sensor 640 may include a sensor suite, for example as described above. In some cases, at least a sensor 640 may be configured to sense battery pack data and transmit battery pack data to a data storage system, for example as described above.

Figure 7:
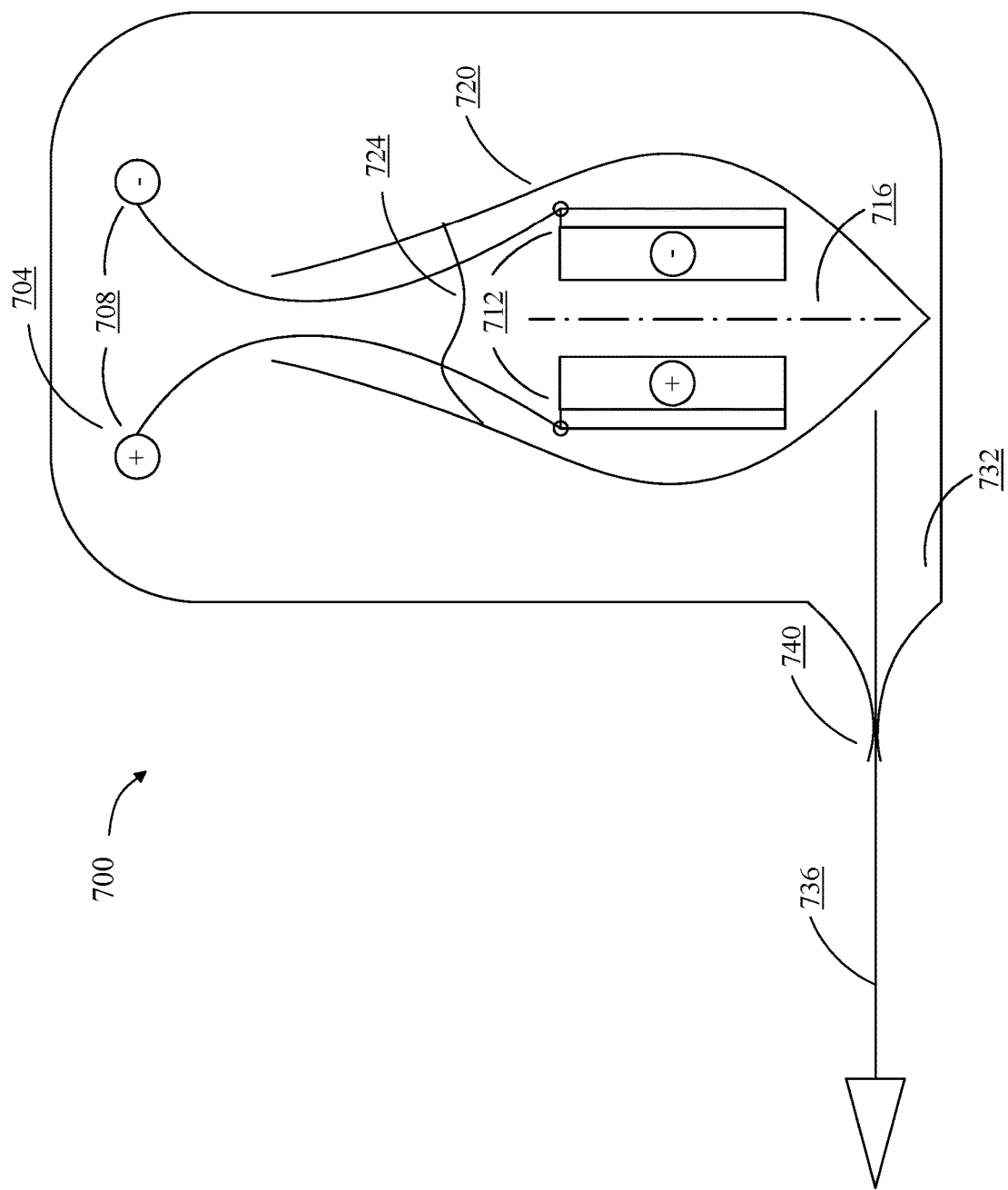
FIG. 7 is a schematic drawing of another exemplary battery pack for preventing progression of thermal runaway between modules.

Referring now to FIG. 7, at least a portion of an exemplary battery pack 700 is illustrated. As shown in FIG. 7, battery pack 700 may include a pouch cell 704. Pouch cell 704 may include at least a pair of electrodes 708, at least a pair of foil tabs 712 in electrical communication with the electrodes 708, at least an insulator layer 716 located substantially between the at least a pair of foil tabs 712, a pouch 720 substantially encompassing the at least a pair of foil tabs 712 and at least a portion of the at least a separator layer 716, and a first electrolyte 724 within the pouch 720. Battery pack 700 may include an ejecta barrier 728. Ejecta barrier 728 may configured to prevent ejecta from one pouch cell 704 from reaching another pouch cell. In some cases, ejecta may include hot matter, which if left uncontained could transfer heat to other, e.g., neighboring, pouch cells. By preventing hot ejecta from reaching pouch cells ejecta barrier 728 may aid in preventing progression of thermal runaway between battery cells within battery pack 700. In some cases, ejecta may include combustible materials, which if left uncontained could settle upon other, e.g., neighboring, pouch cells. Combustible materials once combustion conditions are met may combust generating an exothermic reaction, which can induce thermal runaway on nearby battery cells. Combustion conditions can include presence of oxygen, fuel, spark, flash point, fire point, and/or autoignition temperature. Battery pack 700 may include a vent 732. Vent 732 may provide for ejecta flow along a flow path 736. Vent may include a check valve 740. Check valve 740 may be configured to allow for a flow fluids in substantially one direction, for example away from pouch cell 704. In some cases, vent 732 may be configured to allow for a venting of ejecta from pouch cell 704 without substantially any flow of ejecta toward the pouch cell 704, for example from other battery cells. According to some embodiments, battery pack 700 may be incorporated in an aircraft, for example a vertical take-off and landing aircraft.

Figure 8:
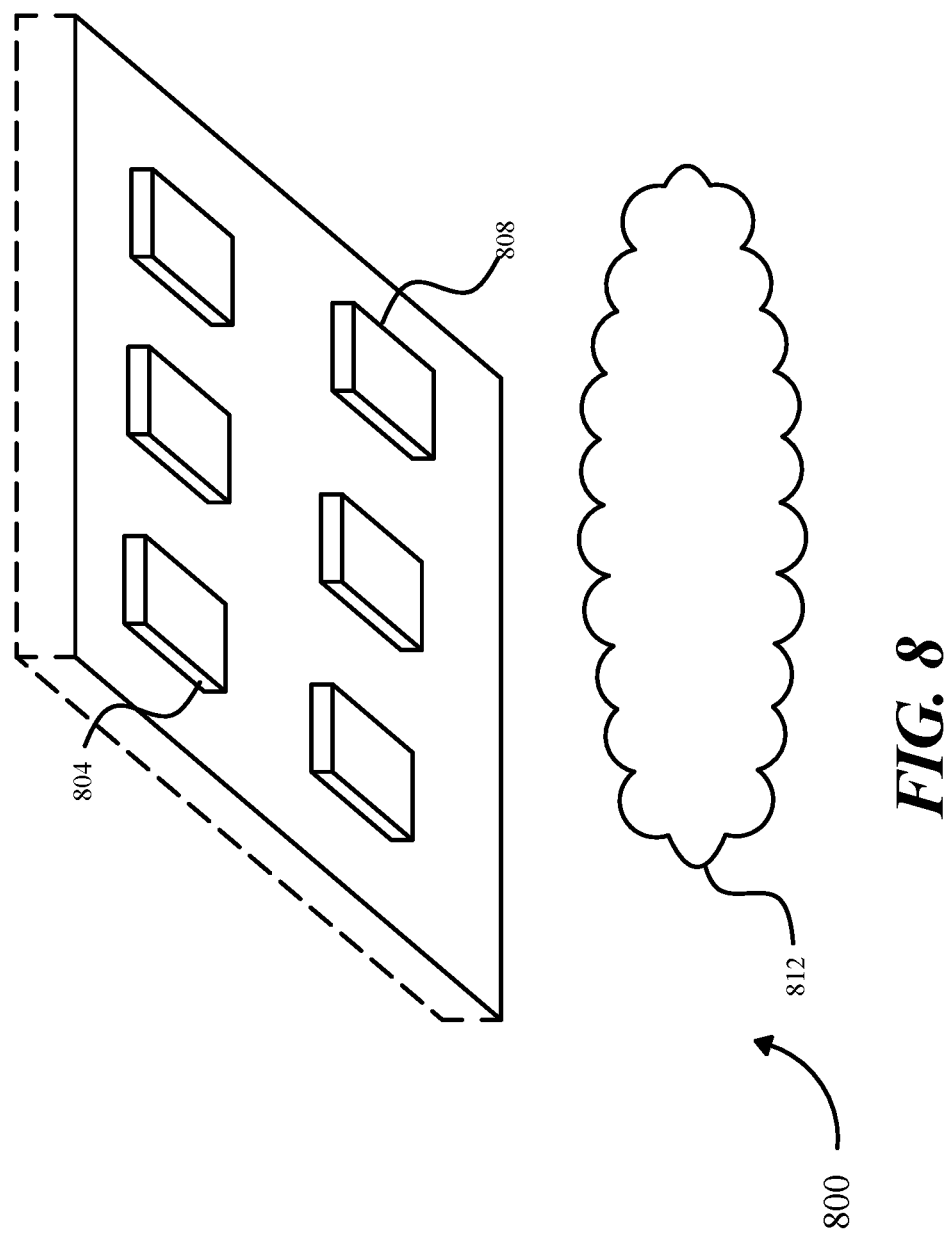
FIG. 8 is a schematic drawing of an exemplary sensor suite.

Referring now to FIG. 8, an embodiment of sensor suite 800 is presented. The herein disclosed system and method may comprise a plurality of sensors in the form of individual sensors or a sensor suite working in tandem or individually. In some cases, sensor suite 800 may communicate by way of at least a conductor, such as within limitation a control signal conductor. Alternatively and/or additionally, in some cases, sensor suite 800 may be communicative by at least a network, for example any network described in this disclosure including wireless (Wi-Fi), controller area network (CAN), the Internet, and the like. A sensor suite may include a plurality of independent sensors, as described herein, where any number of the described sensors may be used to detect any number of physical or electrical quantities associated with a vehicle battery or an electrical energy storage system, such as without limitation charging battery. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of computing device 184 and/or user to detect phenomenon is maintained.

With continued reference to FIG. 8, sensor suite 800 may include a humidity sensor 804. Humidity, as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. Humidity sensor 804 may be psychrometer. Humidity sensor 804 may be a hygrometer. Humidity sensor 804 may be configured to act as or include a humidistat. A "humidistat", for the purposes of this disclosure, is a humidity-triggered switch, often used to control another electronic device. Humidity sensor 804 may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 8, sensor suite 800 may include multimeter 808. Multimeter 808 may be configured to measure voltage across a component, electrical current through a component, and resistance of a component. Multimeter 808 may include separate sensors to measure each of the previously disclosed electrical characteristics such as voltmeter, ammeter, and ohmmeter, respectively. Alternatively or additionally, and with continued reference to FIG. 8, sensor suite 800 may include a sensor or plurality thereof that may detect voltage and direct charging of individual battery cells according to charge level; detection may be performed using any suitable component, set of components, and/or mechanism for direct or indirect measurement and/or detection of voltage levels, including without limitation comparators, analog to digital converters, any form of voltmeter, or the like. Sensor suite 800 and/or a control circuit incorporated therein and/or communicatively connected thereto may be configured to adjust charge to one or more battery cells as a function of a charge level and/or a detected parameter. For instance, and without limitation, sensor suite 800 may be configured to determine that a charge level of a battery cell is high based on a detected voltage level of that battery cell or portion of the battery pack. Sensor suite 800 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like.

Sensor suite 800 may include digital sensors, analog sensors, or a combination thereof. Sensor suite 800 may include digital-to-analog converters (DAC), analog-to-digital converters (ADC, A/D, A-to-D), a combination thereof, or other signal conditioning components used in transmission of a battery sensor signal to a destination over wireless or wired connection.

With continued reference to FIG. 8, sensor suite 800 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor suite 800, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

With continued reference to FIG. 8, sensor suite 800 may include a sensor configured to detect gas that may be emitted during or after a catastrophic cell failure. "Catastrophic cell failure", for the purposes of this disclosure, refers to a malfunction of a battery cell, which may be an electrochemical cell, that renders the cell inoperable for its designed function, namely providing electrical energy to at least a portion of an electric aircraft. Byproducts of catastrophic cell failure 812 may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor that may be used in sensor suite 800, may be configured to detect combustible, flammable, toxic, oxygen depleted, a combination thereof, or another type of gas alone or in combination. The gas sensor that may be present in sensor suite 800 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor suite 800 may include sensors that are configured to detect non-gaseous byproducts of catastrophic cell failure 812 including, in non-limiting examples, liquid chemical leaks including aqueous alkaline solution, ionomer, molten phosphoric acid, liquid electrolytes with redox shuttle and ionomer, and salt water, among others. Sensor suite 800 may include sensors that are configured to detect non-gaseous byproducts of catastrophic cell failure 812 including, in non-limiting examples, electrical anomalies as detected by any of the previous disclosed sensors or components.

With continued reference to FIG. 8, sensor suite 800 may be configured to detect events where voltage nears an upper voltage threshold or lower voltage threshold. The upper voltage threshold may be stored in data storage system for comparison with an instant measurement taken by any combination of sensors present within sensor suite 800. The upper voltage threshold may be calculated and calibrated based on factors relating to battery cell health, maintenance history, location within battery pack, designed application, and type, among others. Sensor suite 800 may measure voltage at an instant, over a period of time, or periodically. Sensor suite 800 may be configured to operate at any of these detection modes, switch between modes, or simultaneous measure in more than one mode. Computing device may detect through sensor suite 800 events where voltage nears the lower voltage threshold. The lower voltage threshold may indicate power loss to or from an individual battery cell or portion of the battery pack. Computing device may detect through sensor suite 800 events where voltage exceeds the upper and lower voltage threshold. Events where voltage exceeds the upper and lower voltage threshold may indicate battery cell failure or electrical anomalies that could lead to potentially dangerous situations for aircraft and personnel that may be present in or near its operation.

With continued reference to FIG. 8, in some cases, sensor suite 800 may include a swell sensor configured to sense swell, pressure, or strain of at least a battery cell. In some cases, battery cell swell, pressure, and/or strain may be indicative of an amount of gases and/or gas expansion within a battery cell. Battery swell sensor may include one or more of a pressure sensor, a load cell, and a strain gauge. In some cases, battery swell sensor may output a battery swell signal that is analog and requires signal processing techniques. For example, in some cases, wherein battery swell sensor includes at least a strain gauge, battery swell signal may be processed and digitized by one or more of a Wheatstone bridge, an amplifier, a filter, and an analog to digital converter. In some cases, battery sensor signal may include battery swell signal.

Figure 9:
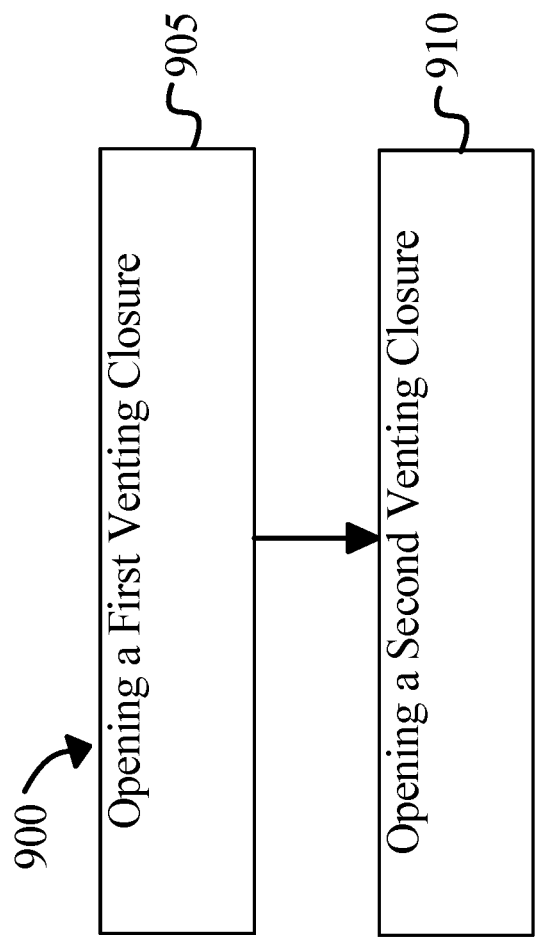
FIG. 9 is a flow diagram illustrating a method of cooling a HV cable on an electric aircraft.

Referring now to FIG. 9, an exemplary embodiment of a method 900 for implementing a system for cooling a HV cable on an electric aircraft 108 is illustrated. At step 905, first venting closure 132, at first side of fuselage 112 of electric aircraft 108 that is configured to receive HV cable, movable between an open position and a closed position, is opened; this may be implemented, without limitation, as described above in reference to FIGS. 1-9.

At step 910, and still referring to FIG. 9, second venting closure, at second side of fuselage 112 opposite first side, movable between an open position and a closed position, is opened; this may be implemented, without limitation, as described above in reference to FIGS. 1-9. First venting closure 132 and second venting closure are configured to create cooling channel between first venting closure and second venting closure when the first venting closure and the second venting closure are in the open position. Cooling channel contacts and may cool battery pack. At least one of first venting closure and second venting closure may provide access to high voltage connection configured to electrically connect to battery pack. Fuselage may include electrical vehicle port, wherein at least one of first venting closure and second venting closure may be configured to provide access to electrical vehicle port. Fuselage may include bottom side facing the ground and first side of fuselage may include passenger entrance 116, wherein first venting closure may be between the passenger entrance 116 and the bottom side. First venting closure may face second venting closure. Electric aircraft may comprise an eVTOL aircraft. First venting closure and second venting closure may each comprise a securing mechanism to maintain first venting closure and second venting closure in the closed position. First venting closure and second venting closure may each comprise a hydraulic piston. First venting closure and second venting closure may each be attached to actuators including a conversion mechanism for converting an electrical signal to a mechanical signal. Actuators may be configured to move first venting closure and second venting closure to the open position when a triggering event occurs.

Figure 10:
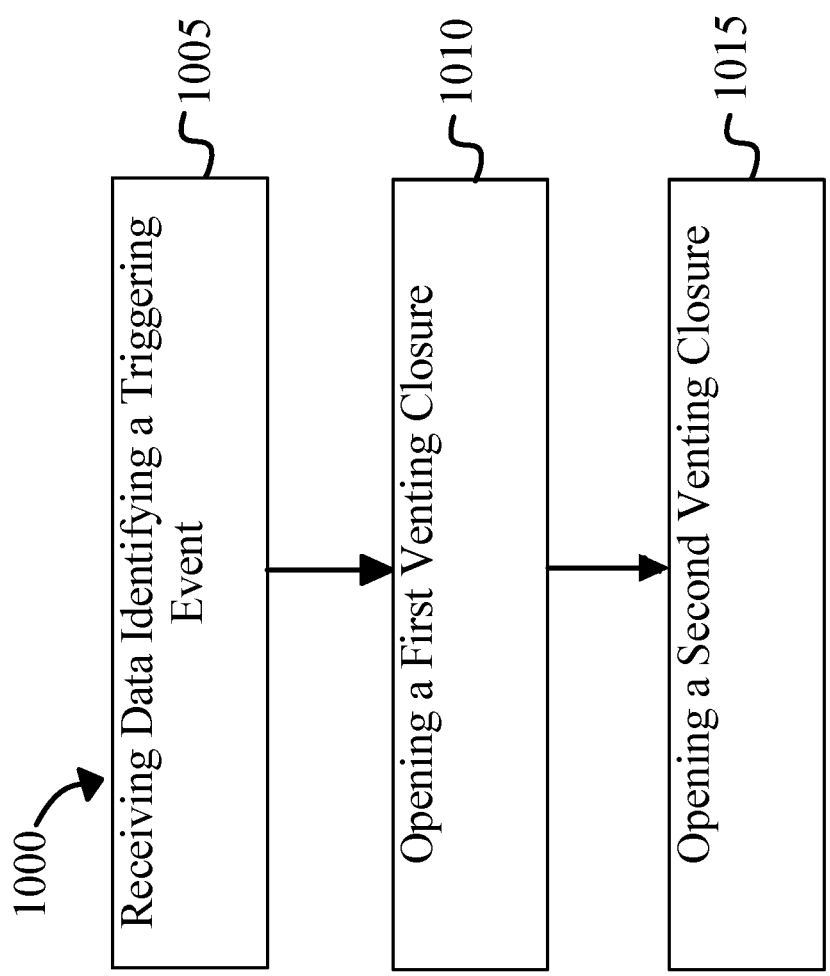
FIG. 10 is a flow diagram illustrating another method of cooling a HV cable on an electric aircraft.

Referring now to FIG. 10, another exemplary embodiment of a method 1000 for implementing a system for cooling a HV cable 104 on an electric aircraft 108 is illustrated. At step 1005, computing device, commutatively connected to a sensor 188, receives from sensor data identifying occurrence of a triggering event; this may be implemented, without limitation, as described above in reference to FIGS. 1-10.

At step 1010, computing device, communicatively connected to a first venting closure at first side of fuselage of electric aircraft that is configured to receive battery pack, moves first venting closure from a closed position to an open position; this may be implemented, without limitation, as described above in reference to FIGS. 1-10.

At step 1015, and still referring to FIG. 10, computing device, communicatively connected to a second venting closure at second side of fuselage of the electric aircraft, moves second venting closure from a closed position to an open position; this may be implemented, without limitation, as described above in reference to FIGS. 1-10.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
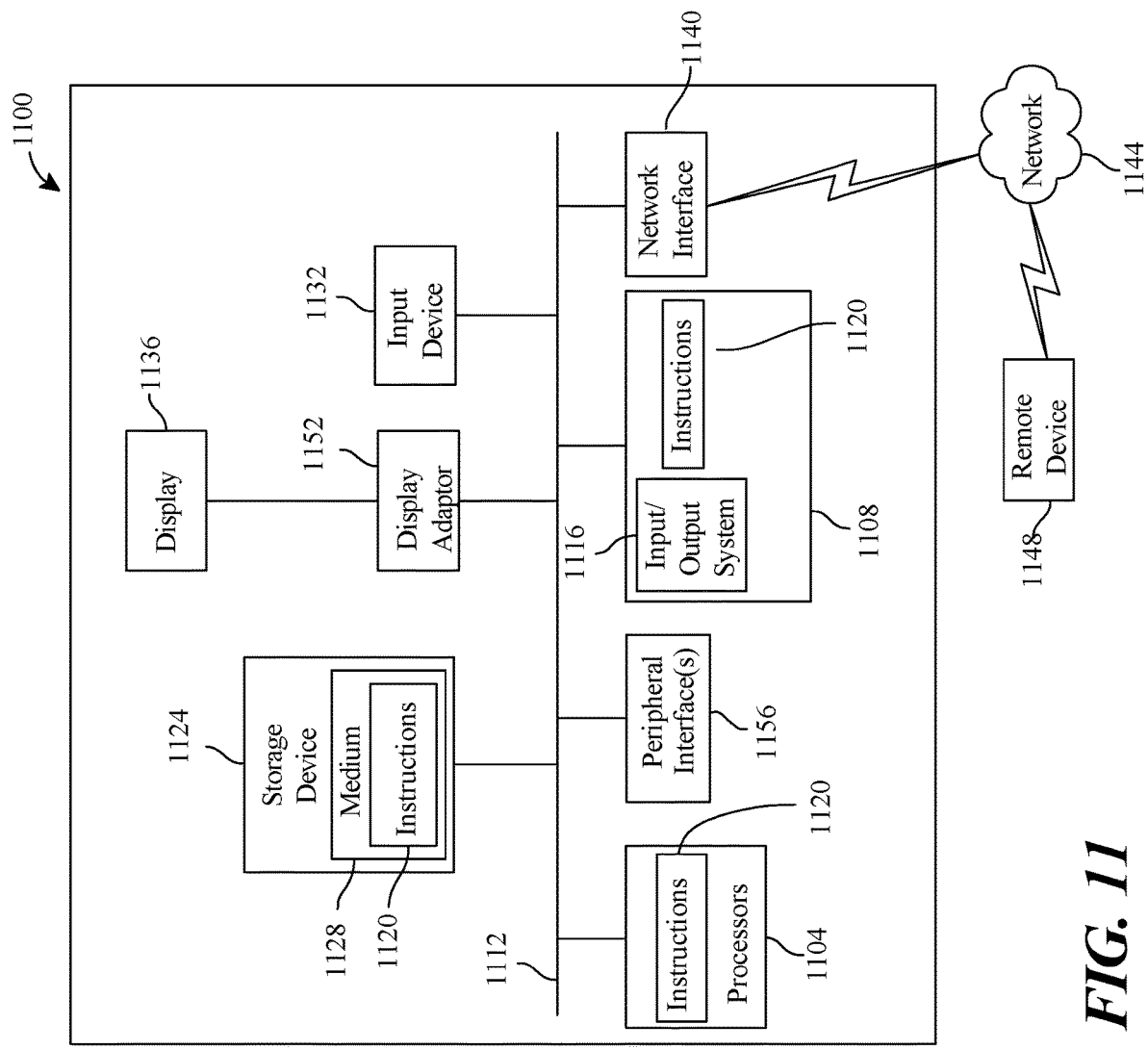
FIG. 11 is a block diagram of a computing system that can be used to implement any one or more of the methodologies disclosed in this disclosure and any one or more portions thereof in accordance with aspects of the invention.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for cooling a high voltage (HV) cable on an electric aircraft, comprising:
   a fuselage configured to receive the HV cable, comprising:
      a first side comprising a first venting closure movable between an open position and a closed position;
   a sensor suite, including at least a gas sensor, communicatively connected to an actuator, wherein the sensor suite is configured to measure a triggering event; and
   the actuator configured to move the first venting closure to the open position as a function of the triggering event.

2. The system of claim 1, wherein the first venting closure provides access to a high voltage connection configured to electrically connect to the HV cable.

3. The system of claim 1, wherein the fuselage comprises an electrical vehicle port, wherein the first venting closure is configured to provide access to the electrical vehicle port.

4. The system of claim 1, wherein the electric aircraft comprises an electric vertical takeoff and landing (eVTOL) aircraft.

5. The system of claim 1, wherein the first venting closure comprises a securing mechanism to maintain the first venting closure in the closed position.

6. The system of claim 1, wherein the first venting closure comprises a hydraulic piston.

7. The system of claim 1, wherein the first venting closure is attached to the actuator comprising a conversion mechanism for converting an electrical signal to a mechanical signal.

8. The system of claim 1, wherein the fuselage further comprises a second side opposite the first side, the second side comprising a second venting closure movable between an open position and a closed position; wherein the first and second venting closures are configured to create a cooling channel between the first and second venting closures when the first and second venting closures are in the open position, wherein the cooling channel contacts the HV cable.

9. The system of claim 8, wherein the first venting closure faces the second venting closure.

10. A method for implementing a system for cooling a high voltage (HV) cable on an electric aircraft, comprising:
    opening, at a first side of a fuselage of the electric aircraft that is configured to receive the HV cable, a first venting closure movable between an open position and a closed position;
    opening, at a second side of the fuselage opposite the first side, a second venting closure movable between an open position and a closed position;
    wherein the first and second venting closures are configured to create a cooling channel between the first and second venting closures when the first and second venting closures are in the open position, wherein the cooling channel contacts the HV cable; and
    a sensor suite, including at least a gas sensor, communicatively connected to an actuator, wherein the sensor suite is configured to measure a triggering event; and
    the actuator configured to move the first venting closure to the open position as a function of the triggering event.

11. The method of claim 10, wherein the at least one of the first and second venting closures provide access to a high voltage connection configured to electrically connect to the HV cable.

12. The method of claim 10, wherein the fuselage comprises an electrical vehicle port, wherein at least one of the first and second venting closures is configured to provide access to the electrical vehicle port.

13. The method of claim 10, wherein the fuselage further comprises a bottom side facing the ground, wherein the first side of the fuselage further comprises a passenger entrance, wherein the first venting closure is between the passenger entrance and the bottom side.

14. The method of claim 10, wherein the first venting closure faces the second venting closure.

15. The method of claim 10, wherein the electric aircraft comprises an electric vertical takeoff and landing (eVTOL) aircraft.

16. The method of claim 10, wherein the first and second venting closures each comprise a securing mechanism to maintain the first and second venting closures in the closed position.

17. The method of claim 10, wherein the first and second venting closures each comprise a hydraulic piston.

18. The method of claim 10, wherein the first and second venting closures are attached to actuators comprising a conversion mechanism for converting an electrical signal to a mechanical signal.

\* \* \* \* \*